US011621892B2

(12) United States Patent
Kim et al.

(10) Patent No.: US 11,621,892 B2
(45) Date of Patent: Apr. 4, 2023

(54) TEMPORAL-BASED NETWORK EMBEDDING AND PREDICTION

(71) Applicant: Adobe Inc., San Jose, CA (US)

(72) Inventors: Sungchul Kim, San Jose, CA (US); Di Jin, Ann Arbor, MI (US); Ryan A. Rossi, Santa Clara, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 189 days.

(21) Appl. No.: 17/095,070

(22) Filed: Nov. 11, 2020

(65) Prior Publication Data

US 2022/0150123 A1 May 12, 2022

(51) Int. Cl.
*H04L 41/12* (2022.01)
*H04L 43/067* (2022.01)
*G06F 16/901* (2019.01)
*H04L 41/14* (2022.01)
*H04L 43/045* (2022.01)

(52) U.S. Cl.
CPC .......... *H04L 41/12* (2013.01); *G06F 16/9024* (2019.01); *H04L 41/14* (2013.01); *H04L 43/045* (2013.01); *H04L 43/067* (2013.01)

(58) Field of Classification Search
CPC ....... H04L 41/12; H04L 41/14; H04L 43/045; H04L 43/067; G06F 16/9024
USPC .......................................................... 709/223
See application file for complete search history.

(56) References Cited

U.S. PATENT DOCUMENTS

| 2015/0293954 | A1* | 10/2015 | Hsiao ...................... G06F 16/22 715/738 |
| 2019/0361900 | A1* | 11/2019 | Rogynskyy ........... H04M 15/58 |
| 2019/0362249 | A1* | 11/2019 | Rogynskyy ............ G16H 50/20 |
| 2020/0074246 | A1* | 3/2020 | Goyal .................. G06K 9/6274 |
| 2020/0292608 | A1* | 9/2020 | Yan ...................... G06N 3/0445 |

OTHER PUBLICATIONS

Ahmed, Nesreen K. et al., "Learning Role-based Graph Embeddings", arXiv preprint [retrieved Dec. 3, 2020]. Retrieved from the Internet <https://arxiv.org/pdf/1802.02896.pdf>., Jul. 2, 2018, 8 pages.

(Continued)

*Primary Examiner* — Brian Whipple
(74) *Attorney, Agent, or Firm* — FIG. 1 Patents

(57) ABSTRACT

Deriving network embeddings that represent attributes of, and relationships between, different nodes in a network while preserving network data temporal and structural properties is described. A network representation system generates a plurality of graph time-series representations of network data that each includes a subset of nodes and edges included in a time segment of the network data, constrained either by time or a number of edges included in the representation. A temporal graph of the network data is generated by implementing a temporal model that incorporates temporal dependencies into the graph time-series representations. From the temporal graph, network embeddings for the network data are derived, where the network embeddings capture temporal dependencies between nodes, as indicated by connecting edges, as well as temporal structural properties of the network data. Network embeddings represent network data in a low-dimensional latent space, which is useable to generate a prediction regarding the network data.

20 Claims, 8 Drawing Sheets

(56) References Cited

OTHER PUBLICATIONS

Bhadra, Sandeep et al., "Complexity of Connected Components in Evolving Graphs and the Computation of Multicast Trees in Dynamic Networks", International Conference on Ad-Hoc Networks and Wireless. Springer, Berlin, Heidelberg [retrieved Dec. 3, 2020]., Retrieved from the Internet <ftp://nozdr.ru/biblio/kolxoz/Cs/CsLn/A/Ad-Hoc,%20Mobile,%20and%20Wireless%20Networks,%202%20conf.,%20ADHOC-NOW%202003%20Montreal(LNCS2865,%20Springer,%202003)(ISBN%203540202609)(313s)_CsLn_.pdf#page=269>., Oct. 2003, 12 pages.

Bojchevski, Aleksandar et al., "Deep Gaussian Embedding of Graphs: Unsupervised Inductive Learning via Ranking", arXiv Preprint [retrieved Dec. 7, 2020]. Retrieved from the Internet <https://arxiv.org/pdf/1707.03815.pdf>., Feb. 27, 2018, 13 pages.

Chang, Hyunseok et al., "Internet connectivity at the AS-level: an optimization-driven modeling approach", In Proceedings of the ACM SIGCOMM workshop on Models, methods and tools for reproducible network research [retrieved Dec. 7, 2020]. Retrieved from the Internet <http://citeseerx.ist.psu.edu/viewdoc/download?doi=10.1.1.14.181&rep=rep1&type=pdf>., Aug. 2003, 14 pages.

Coffman, Kerry G. et al., "Growth of the Internet", In Optics and Photonics, Optical Fiber Telecommunications IV-B (Fourth Edition), Academic Press [retrieved Dec. 7, 2020]. Retrieved from the Internet <https://doi.org/10.1016/B978-012395173-1/50002-5>., May 22, 2002, 40 pages.

Donnat, Claire et al., "Learning Structural Node Embeddings via Diffusion Wavelets", In Proceedings of the 24th ACM SIGKDD International Conference on Knowledge Discovery & Data Mining (KDD '18). Association for Computing Machinery, New York, NY [retrieved Dec. 7, 2020]. Retrieved from the Internet <https://arxiv.org/pdf/1710.10321.pdf>., Jun. 20, 2018, 10 pages.

Ferreira, Afonso et al., "A Note on Models, Algorithms, and Data Structures for Dynamic Communication Networks", INRIA. 2002 [retrieved Feb. 8, 2021]. Retrieved from the Internet <https://hal.inria.fr/inria-00072185/document>., Mar. 2002, 12 pages.

Goyal, Palash et al., "DynGEM: Deep Embedding Method for Dynamic Graphs", arXiv Preprint, arXiv.org [Feb. 3, 2021]. Retrieved from the Internet <https://arxiv.org/pdf/1805.11273.pdf>., May 29, 2018, 8 pages.

Goyal, Palash et al., "dyngraph2vec: Capturing network dynamics using dynamic graph representation learning", arXiv Preprint, arXiv.org [retrieved Feb. 3, 2021]. Retrieved from the Internet <https://arxiv.org/pdf/1809.02657.pdf>., Jul. 2, 2019, 10 pages.

Grover, Aditya et al., "node2vec: Scalable Feature Learning for Networks", arXiv Preprint, arXiv.org [Feb. 3, 2021]. Retrieved from the Internet <https://arxiv.org/pdf/1607.00653.pdf>., Jul. 3, 2016, 10 pages.

Hisano, Ryohei, "Semi-supervised Graph Embedding Approach to Dynamic Link Prediction", arXiv Preprint, arXiv.org [retrieved Feb. 3, 2021]. Retrieved from the Internet <https://arxiv.org/pdf/1610.04351.pdf>., Oct. 14, 2016, 15 pages.

Jin, Di et al., "Latent Network Summarization: Bridging Network Embedding and Summarization", arXiv Preprint, arXiv.org [retrieved Feb. 8, 2021]. Retrieved from the Internet <https://arxiv.org/pdf/1811.04461.pdf>., Jun. 20, 2019, 11 pages.

Jin, Di et al., "node2bits: Compact Time- and Attribute-aware Node Representations for User Stitching", arXiv Preprint, arXiv.org [retrieved Feb. 8, 2021]. Retrieved from the Internet <https://arxiv.org/pdf/1904.08572.pdf>., Sep. 19, 2019, 22 pages.

Kamra, Nitin et al., "Deep Generative Dual Memory Network for Continual Learning", arXiv Preprint, arXiv.org [retrieved Feb. 8, 2021]. Retrieved from the Internet <https://arxiv.org/pdf/1710.10368.pdf>., May 25, 2018, 15 pages.

Kumar, Srijan et al., "Predicting Dynamic Embedding Trajectory in Temporal Interaction Networks", KDD: proceedings. International Conference on Knowledge Discovery & Data Mining [retrieved Feb. 2021]. Retrieved from the Internet <https://www.ncbi.nlm.nih.gov/pmc/articles/PMC6752886/pdf/nihms-1047384.pdf>., Jul. 2019, 30 pages.

Leskovec, Jure et al., "Graphs over Time: Densification Laws, Shrinking Diameters and Possible Explanations", KDD '05: Proceedings of the eleventh ACM SIGKDD international conference on Knowledge discovery in data mining [retrieved Feb. 8, 2021]. Retrieved from the Internet <https://cis.temple.edu/~Vasilis/Courses/CIS664/Papers/kdd05-Graphs-Over-Time.pdf>., Aug. 2005, 11 pages.

Leskovec, Jure et al., "SNAP Datasets: Stanford Large Network Dataset Collection", Stanford University [retrieved Feb. 8, 2021]. Retrieved from the Internet <http://snap.stanford.edu/data/>., Jun. 2014, 6 pages.

Li, Jundong et al., "Attributed Network Embedding for Learning in a Dynamic Environment", arXiv Preprint, arXiv.org [retrieved Feb. 8, 2021]. Retrieved from the Internet <https://arxiv.org/abs/1706.01860>., Aug. 26, 2018, 10 pages.

Nguyen, Giang H. et al., "Continuous-Time Dynamic Network Embeddings", WWW'18: Companion Proceedings of the The Web Conference 2018 [retrieved Feb. 8, 2021]. Retrieved from the Internet <https://doi.org/10.1145/3184558.3191526>., Apr. 2018, 8 pages.

Ribiro, Leonardo F. et al., "struc2vec: Learning Node Representations from Structural Identity", KDD'17: Proceedings of the 23rd ACM SIGKDD International Conference on Knowledge Discovery and Data Mining [retrieved Feb. 8, 2021]. Retrieved from the Internet <https://arxiv.org/pdf/1704.03165.pdf>., Jul. 3, 2017, 10 pages.

Ross, Ryan A. et al., "Similarity-based Multi-label Learning", 2018 International Joint Conference on Neural Networks (IJCNN) [retrieved Feb. 8, 2021]. Retrieved from the Internet <http://ryanrossi.com/pubs/IJCNN18-SML.pdf>., Jul. 2018, 8 pages.

Rossi, Ryan et al., "Modeling the Evolution of Discussion Topics and Communication to Improve Relational Classification", SOMA '10: Proceedings of the First Workshop on Social Media Analytics [retrieved Feb. 8, 2021]. Retrieved from the Internet <http://snap.stanford.edu/soma2010/papers/soma2010_13.pdf>., Jul. 25, 2010, 9 pages.

Rossi, Ryan et al., "Role-Dynamics: Fast Mining of Large Dynamic Networks", WWW'12 Companion: Proceedings of the 21st International Conference on World Wide Web [retrieved Feb. 8, 2021]. Retrieved from the Internet <https://www.cs.purdue.edu/homes/neville/papers/rossi-lsna2012.pdf>., Apr. 2012, 9 pages.

Rossi, Ryan et al., "Time-Evolving Relational Classification and Ensemble Methods", Advances in Knowledge Discovery and Data Mining. PAKDD 2012. Lecture Notes in Computer Science, vol. 7301. Springer, Berlin, Heidelberg [retrieved Feb. 8, 2021]., Retrieved from the Internet <https://www.cs.purdue.edu/homes/neville/papers/rossi-neville-pakdd2012.pdf>., Jun. 2, 2012, 12 pages.

Rossi, Ryan A. et al., "Deep Inductive Network Representation Learning", WWW '18: Companion Proceedings of the The Web Conference 2018 [retrieved Feb. 8, 2021]. Retrieved from the Internet <http://ryanrossi.com/pubs/rossi-et-al-WWW18-BigNet.pdf>., Apr. 2018, 8 pages.

Rossi, Ryan A. et al., "From Community to Role-based Graph Embeddings", arXiv Preprint [retrieved Nov. 20, 2020]. Retrieved from the Internet <https://arxiv.org/pdf/1908.08572v1.pdf>., Aug. 22, 2019, 31 pages.

Rossi, Ryan A. et al., "Role Discovery in Networks", IEEE Transactions on Knowledge and Data Engineering, vol. 27, No. 4 [retrieved Feb. 8, 2021]. Retrieved from the Internet <http://ryanrossi.com/papers/rossi-ahmed-TKDE2014.pdf>., Aug. 2014, 20 pages.

Rossi, Ryan A. et al., "The Network Data Repository with Interactive Graph Analytics and Visualization", Twenty-Ninth AAAI Conference on Artificial Intelligence, vol. 29, No. 1 [retrieved Feb. 8, 2021]. Retrieved from the Internet <https://ojs.aaai.org/index.php/AAAI/article/view/9277/9136>., Mar. 4, 2015, 2 pages.

Sankar, Aravind et al., "DySAT: Deep Neural Representation Learning on Dynamic Graphs via Self-Attention Networks", WSDM '20: Proceedings of the 13th International Conference on Web Search and Data Mining [retrieved Feb. 8, 2021]. Retrieved from the Internet <http://yhwu.me/publications/dysat_wsdm20.pdf>., Jan. 2020, 9 pages.

Singer, Uriel et al., "Node Embedding over Temporal Graphs", arXiv Preprint, arXiv.org [retrieved Feb. 8, 2021]. Retrieved from the Internet <https://arxiv.org/pdf/1903.08889.pdf>., Apr. 2, 2019, 11 pages.

(56) References Cited

OTHER PUBLICATIONS

Tang, Jian et al., "LINE: Large-scale Information Network Embedding", arXiv Preprint, arXiv.org [retrieved Feb. 8, 2021]. Retrieved from the Internet <https://arxiv.org/pdf/1503.03578>., Mar. 12, 2015, 11 pages.

Zhang, Min-Ling et al., "ML-KNN: A lazy learning approach to multi-label learning", Pattern Recognition, vol. 40, No. 7 [retrieved Feb. 8, 2021]. Retrieved from the Internet <https://cs.nju.edu.cn/zhouzh/zhouzh.files/publication/pr07.pdf>., Jul. 2007, 22 pages.

Zhang, Ziwei et al., "TIMERS: Error-Bounded SVD Restart on Dynamic Networks", Proceedings of the AAAI Conference on Artificial Intelligence, vol. 32, No. 1 [retrieved Feb. 8, 2021]. Retrieved from the Internet <https://ojs.aaai.org/index.php/AAAI/article/view/11299/11158>., Apr. 25, 2018, 8 pages.

Zhou, Lekui et al., "Dynamic Network Embedding by Modeling Triadic Closure Process", Proceedings of the AAAI Conference on Artificial Intelligence, vol. 32, No. 1 [retrieved Feb. 8, 2021]. Retrieved from the Internet <https://ojs.aaai.org/index.php/AAAI/article/view/11257/11116>., Apr. 25, 2018, 8 pages.

Zuo, Yuan et al., "Embedding Temporal Network via Neighborhood Formation", KDD '18: Proceedings of the 24th ACM SIGKDD International Conference on Knowledge Discovery & Data Mining [retrieved Feb. 8, 2021]., Retrieved from the Internet <http://shichuan.org/hin/topic/Embedding/2018.KDD%202018%20Embedding%20Temporal%20Network%20via%20Neighborhood%20Formation.pdf>., Jul. 2018, 10 pages.

\* cited by examiner

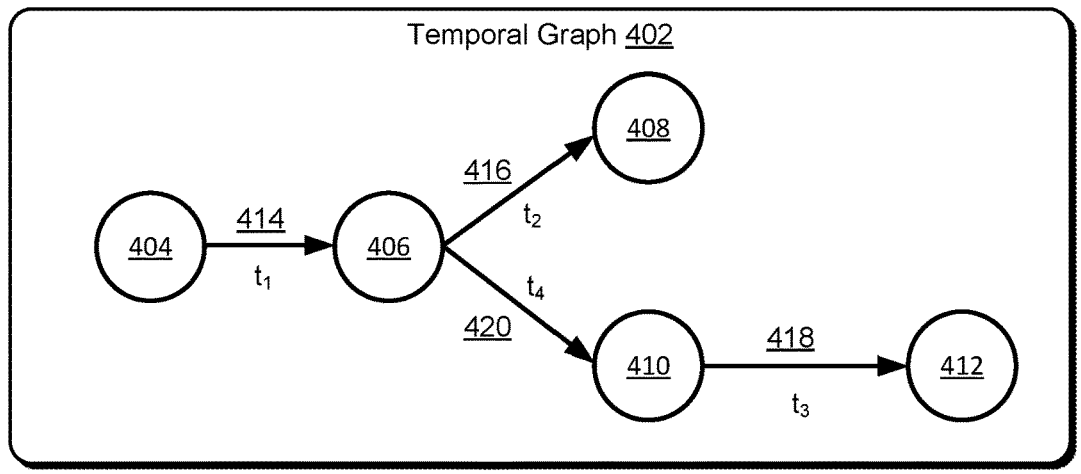
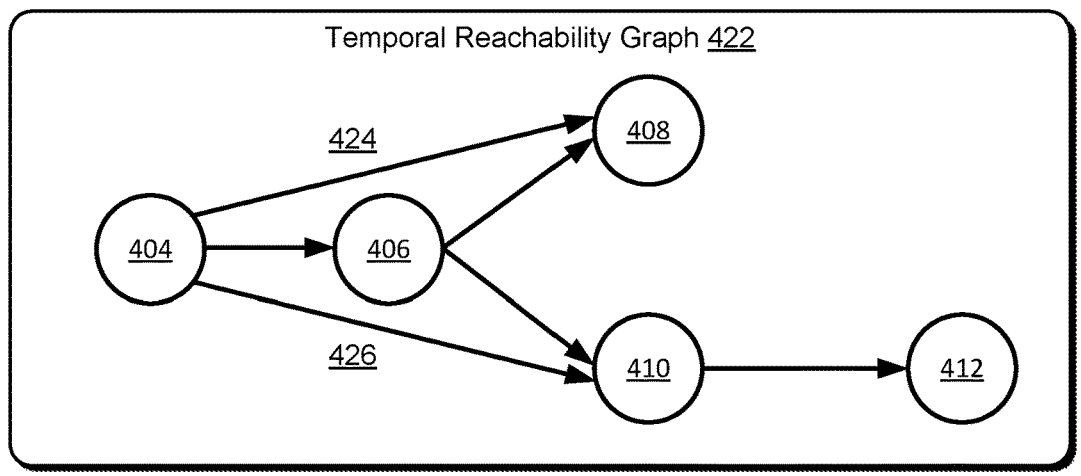
Fig. 4

TEMPORAL-BASED NETWORK EMBEDDING AND PREDICTION

Computer-implemented networks (e.g., the Internet, social networking platforms, academic citation and collaboration platforms, and so forth) are increasingly used to record interactions between entities (e.g., different computing devices connected via the network). In a graphical representation of the network, entities are represented as "nodes," and are connected to one another via "edges." For instance, an example graph representation of different computing device nodes would create an edge between two nodes representing an email sent from one of the computing device nodes to another. Because nodes and edges continuously change over time, it remains a challenge to derive an accurate representation, or "embedding," that accounts for temporal dynamics and temporal structural properties of changing nodes and edges.

Network node embeddings are often used for various downstream machine learning objectives such as entity resolution tasks, forecasting tasks, and so forth. Accordingly, properly accounting for the temporal dynamics and temporal structural properties is critical to the accuracy of such downstream machine learning objectives. Conventional approaches to deriving such network embeddings, however, are unable to properly model temporal dynamics and structural properties that reflect real-time changes to such computer-implemented networks. Accordingly, conventional systems rely on static network embeddings that fail to account for changing temporal network dynamics and consequently misrepresent the network structure for use in downstream tasks.

SUMMARY

A system and techniques are described for deriving network embeddings for network data that represent attributes of, and relationships between, different nodes in a network while preserving temporal dependencies and temporal structural properties of the network data. A network representation system generates a plurality of graph time-series representations of network data that each includes a subset of nodes and edges included in a time segment of the network data. Individual graph time-series representations are constrained either by an amount of time represented by, or an amount of edges included in, the graph time-series representation, such that different graph time-series representations generated from network data encompass a same amount of time or include a same amount of edges. Given the time-constrained or edge-constrained graph time-series representations of the network data, a temporal graph of the network data is generated by implementing a temporal model that incorporates temporal dependencies into the graph time-series representations.

From the temporal graph, network embeddings for the network data are derived, where the network embeddings capture temporal dependencies between nodes, as indicated by connecting edges, as well as temporal structural properties of the network data (e.g., amounts and attributes of nodes and edges). In implementations where the network data is received as a constant stream, the techniques described herein constantly derive and update network embedding based on newly received network data. The network embeddings represent network data in a low-dimensional latent space, which is useable by prediction models, classification models, and the like to generate a prediction for, or otherwise classify network data in a manner that would be intractable if performed on the raw network data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 4 illustrates an example implementation of temporal reachability graph generated by the network representation system of FIG. 1.

DETAILED DESCRIPTION

Overview

Figure 1:
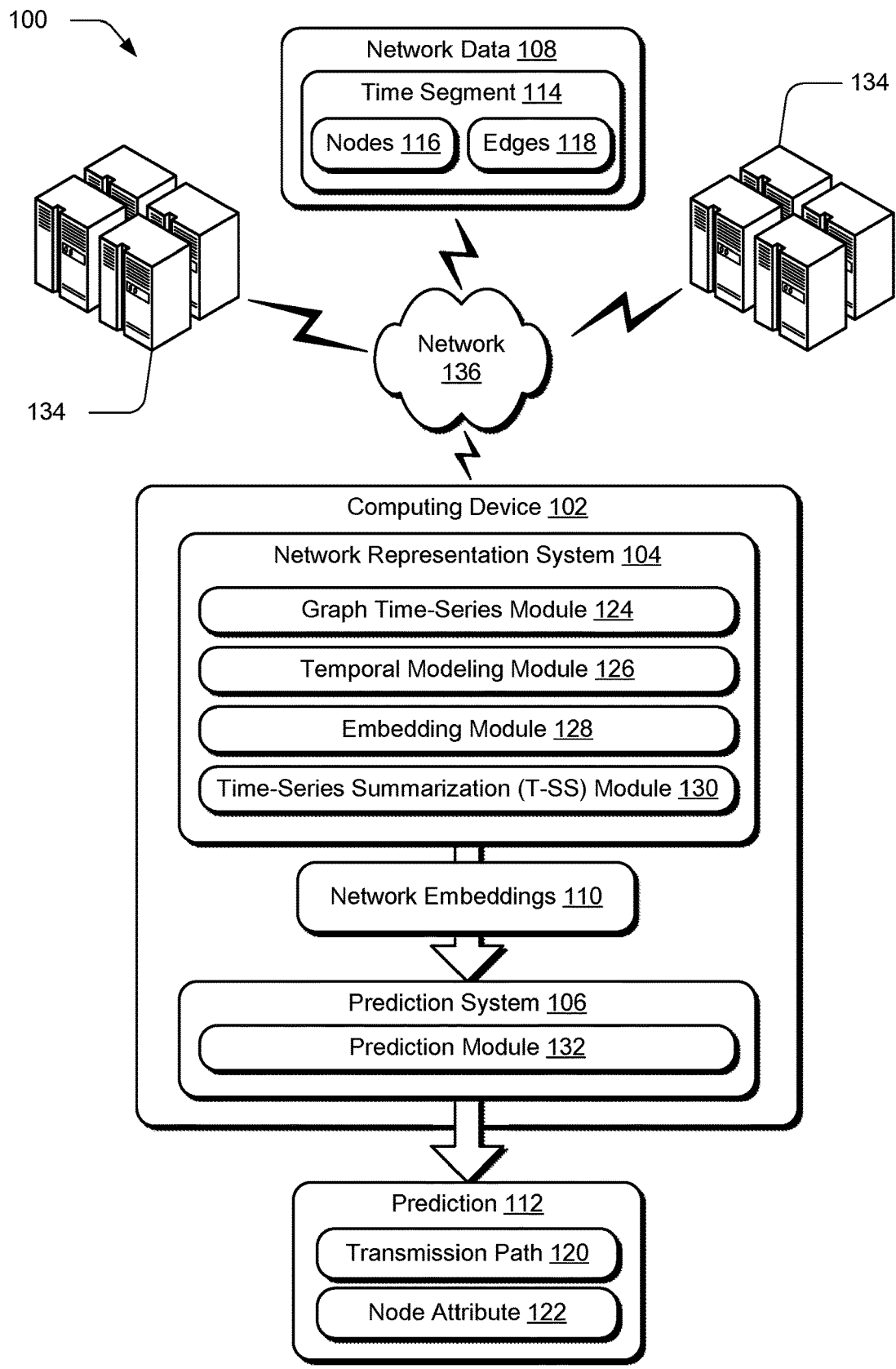
FIG. 1 is an illustration of an environment in an example implementation that is operable to employ the temporal-based network embedding and prediction techniques described herein.

Networks such as social networking platforms, office intranets, the World Wide Web, and so forth provide a universal mechanism for organizing diverse real-world information. Networks can be graphically represented as a series of nodes and edges, where nodes are representative of network entities and edges are representative of connections between different network entities. Individual nodes are associated with node attributes, which characterize real-world aspects of the corresponding network entity. Given the vast amount of data included in a single network, node/edge structural representations of a network are often incomplete, lacking sufficient node attributes to accurately characterize a network entity. Given this sparse information included the graphical representation of a network, various conventional approaches have been developed to predict missing attributes that characterize nodes and/or edges of the network structure. For instance, in the context of a social networking platform, conventional approaches have been designed to predict which communities in which a given user profile node is a member.

Because some real-world networks include billions of nodes and edges and represent heterogeneous types of nodes and edges, accurately deriving predictions from data representing an entire network is intractable. To address this intractability, conventional approaches to network modeling have been developed to learn network embeddings for a given network. Generally, these conventional approaches seek to identify a mapping function that converts each node in the network to a latent space representation, thus reducing a dimensionality of data representing the network. From the network embeddings, conventional classification models are implemented to predict missing network node attributes.

Conventional approaches to deriving network embeddings break down the graphical representation of a network into snapshots that include only nodes and edges observed in the network over a specified duration. Such snapshots are created to span an application-specific duration. For instance, a conventional approach designed to predict node attributes over a future hour generates a snapshot that represents a previous hour of network nodes and edges. From the single snapshot graph, network embeddings are derived and used to make predictions pertaining to the future hour. However, such conventional snapshot graphs fail to provide an accurate representation of most network structures, given the highly dynamic nature of nodes and edges changing over time.

To address this shortcoming, other conventional approaches generate multiple snapshot graphs (e.g., five snapshot graphs each covering one of a previous five hours), derive network embeddings from each individual snapshot, and merge the network embeddings using operations tailored specifically for the predictive modeling task for which the network embeddings were derived. However, these conventional approaches are restricted to the specific predictive task for which they are designed. Further, the operations tailed specifically for the predictive modeling task are computationally intensive, requiring substantial amounts of computational and networking resources to complete. For instance, conventional network representation and embedding systems aim to merge embeddings learned from different time-constrained network snapshots. In doing so, conventional systems introduce additional latent variables, which are computationally expensive (e.g., require considerable computational resources and time) to process and generate merged embeddings from the different time-constrained snapshots. Thus, conventional approaches to generating network embeddings mischaracterize network data and are computationally expensive to perform, consequently resulting in excessive consumption of computing and network resources as well as inaccurate predictions generated from conventional network embeddings.

Accordingly, techniques for deriving network embeddings that preserve temporal relationships and dependences in real-time streaming network data, and generating predictions from the network embeddings, are described. A network representation system receives at least one time segment of network data, where the time segment includes nodes and edges that collectively represent network activity during the time segment. From the time segment, the network representation system generates at least one graph time-series representation of the nodes and edges included in the time segment. Each graph time-series representation is constrained to include all nodes and edges observed during a subset duration of the time segment of network data.

Alternatively, each graph time-series representation is constrained to include a fixed number of edges, such that a plurality of graph time-series representations are generated for the time segment of network data, where each graph time-series representation includes a same number of edges. Fixing a number of edges represented in a graph time-series representation of network data advantageously enables the network representation system to control structural properties of the graph time-series representation otherwise not enabled by time-constrained graph time-series representations. For instance, in real-world networks, the amount of edges that occur during a given time segment (e.g., hour, day, month, etc.) differs significantly from the amount of edges that occur during another time segment of the same duration. In edge-constrained graph time-series representations, because the number of represented edges remains constant over the plurality of graph time-series representations generated for a time segment of network data, network embeddings learned from edge-constrained graph time-series representations are relatively similar due to being learned from a constant number of edges. For instance, given a first arbitrary graph and a second arbitrary graph, where a number of edges in the first arbitrary graph is much less than a number of edges in the second arbitrary graph, the amount of network embeddings in n-node network motifs, or graphlets, for the second arbitrary graph is consequently larger than the amount of network embeddings in graphlets for the first arbitrary graph. Consequently, by constraining graph time-series representations by an amount of included edges, and nodes linked by those included edges, embeddings learned from adjacent edge-constrained graph time-series representations are reflective of structural changes of the graph over time.

In contrast to the edge-constrained graph time-series representations described herein, conventional approaches that leverage only time-constrained graph time-series representations introduce uncertainty regarding whether a difference in network embeddings learned between adjacent graph time-series representations stems from different numbers of edges represented in the different graph time-series representations or whether the difference in embeddings actually represents changes in network structure over time.

Given the time-constrained or edge-constrained graph time-series representations of the network data, the network representation system generates a temporal graph of the network data by implementing a temporal model that incorporates temporal dependencies into the graph time-series representations. By incorporating temporal dependencies into the graph time-series representations, the network representation system advantageously preserves temporal constraints otherwise disregarded by conventional approaches, such as the snapshot graph approach that discards temporal relationships occurring across multiple snapshot graphs for the same network data. By incorporating temporal dependencies into the graph time-series representations, the network representation system is configured to learn time-dependent network embeddings for the nodes and edges included in the network data.

In some implementations, the temporal dependency of the network data is represented as a temporal reachability graph, which represents a novel graphical structure not contemplated by conventional network modeling approaches. In generating the temporal reachability graph, the network representation system identifies one or more node pairs included in the network data that are not directly connected by one of the edges, but are temporally connected via a sequence of multiple edges within a specified time interval.

In response to identifying that the node pair is temporally connected, an edge directly linking the node pair is added to the temporal reachability graph. The temporal reachability graph further acknowledges temporal properties with respect to added edges, by constraining the sequence of edges to follow a directionality of time during the specified interval. In this manner, a sequence of edges that otherwise connect a node pair during the specified interval but are not temporally ordered in a manner that follows time is not used as a basis to add an edge directly connecting the node pair in the temporal reachability graph.

In some implementations, the network representation system is further configured to generate a weighted version of the temporal reachability graph, where weights are assigned to the additional edges indicating a temporal strength of reachability (e.g., a time required to complete the sequence of edges serving as the basis for generating the additional edge, a number of temporally valid paths connecting the node pair, or combinations thereof). By adding and optionally weighting such edges, a temporal reachability graph for network data represents a feasible data transmission path or connection between two nodes, thus providing additional contextual information regarding network structure and node relationships not otherwise explicitly set forth in the network data. As such, the temporal reachability graph derived using techniques described herein provides additional network information otherwise not considered by conventional network modeling approaches, which results in network embeddings having increased accuracy.

Given the temporal graph generated from the graph time-series representations of the network data, the network representation system is configured to derive network embeddings from the temporal graph by employing one or more embedding methods. The network embeddings capture temporal dependencies between nodes, as indicated by connecting edges, as well as temporal structural properties of the network data (e.g., amounts and attributes of nodes and edges). Advantageously, the techniques described herein enable continuously deriving and updating network embeddings for a constant stream of network data, which captures and preserves temporal relationships that are unable to be maintained by conventional network modeling approaches. The particular embedding method implemented to generate the network embeddings depends on a particular predictive task or objective for which the network embeddings are to be leveraged.

Given the network embeddings, a prediction system is employed to generate a prediction for the network data. Example predictions generated from the network embeddings derived using techniques described herein include a link prediction that indicates a missing edge in the network data that is likely to occur in the future or is likely to have previously occurred but is not represented in the network data. Another example prediction includes a node attribute prediction, which indicates a node attribute value that is not included in the received network data. The network embeddings derived using techniques described herein, however, are not so limited to these example predictive tasks or objectives, and are configured to be leveraged by any predictive, classification, and other model types configured to generate outputs from latent space representations of network data. Because the graph time-series representations and temporal graphs generated from network data are agnostic with respect to a downstream predictive task, the techniques described herein advantageously require fewer computational and network resources relative to conventional approaches that require learnable parameters and performance of specific operations, both tailored for a particular predictive task. Due to the preservation of temporal dependencies and temporal structural changes of network data, as well as the decreased computational resources required relative to conventional approaches, the techniques described herein generate network embeddings in an efficient manner that are useable to generate more reliable network predictions than conventional systems.

Example Environment

FIG. 1 is an illustration of a digital medium environment 100 in an example implementation that is operable to employ the techniques described herein. The illustrated environment 100 includes a computing device 102, which is implementable according to a variety of configurations. For instance, the computing device 102 is configurable as a desktop computer, a laptop computer, a mobile device (e.g., assuming a handheld configuration such as a tablet or mobile phone), and so forth. Thus, the computing device 102 is representative of a full resource device having substantial memory and processor resources (e.g., a personal computer, a server computing device, and the like) as well as a low-resource device having comparatively limited memory and/or processing resources (e.g., a mobile device). In some implementations, although only a single computing device 102 is illustrated in FIG. 1, the computing device 102 is representative of a plurality of different devices, such as multiple server computing devices that are configured to collaboratively perform operations via "the cloud," as described in further detail below with respect to FIG. 8.

The computing device 102 includes a network representation system 104 and a prediction system 106. The network representation system 104 represents functionality of a computing device to generate a low-dimensional latent representation of data obtained via one or more networks, collectively represented by network data 108 in the illustrated environment 100. The low-dimensional latent representation of the network data 108 is represented by the network embeddings 110 output by the network representation system 104. As described herein, the low-dimensional latent representation of the network data 108 included in the network embeddings 110 provides a metric for evaluating similarities and differences between entities represented in the network data 108.

For instance, in an implementation where the network embeddings 110 comprise a two-dimensional latent representation of the network data 108, a distance between two entities represented in the network embeddings 110 indicates a similarity between one or more attributes of the two entities (e.g., closer distance indicates greater similarity relative to further distance). In this manner, the network embeddings 110 represent one or more mapping functions that define the latent representation for each entity represented in the network data 108 as well as the latent representation for each connection between two or more entities represented in the network data 108.

As described in further detail below, the network embeddings 110 generated by the network representation system 104 according to the techniques described herein are configured to be leveraged by a range of different network classification models and/or network prediction models trained to generate a prediction from low-dimensional latent representations of network data. Given the network embeddings 110, the prediction module 106 is configured to generate a prediction 112 corresponding to the network data 108. The network data 108 is representative of information describing different entities and observed connections between the different entities during a time segment 114.

Each of the entities (e.g., a computing device, a physical location, a user profile, an Internet Protocol (IP) address, a Uniform Resource Identifier (URI) for a resource accessible via a network represented by the network data 108, a user profile, or an institution identifying a plurality of user profiles) are represented as a node 116 in the network data 108. Connections between the entities (e.g., a transmission of data from one computing device node to another computing device node, an access of a URI by an IP address, a computing device associating with an IP address, a correlation of an IP address to a physical location, satisfaction of a threshold physical distance between two computing devices, and so forth) are represented as edges 118 in the network data 108.

In this manner, the network data 108 includes data useable to generate a graphical representation of the nodes 116 and edges 118 during the time segment 114, where each node 116 represents an entity observed by a network during the time segment 114 and each edge 118 represents a connection between two different nodes 116 during the time segment 114. Each edge 118 included in the network data 108 includes information specifying a source node 116 and a destination node 116 connected by the edge 118 as well as information denoting a time at which the edge 118 occurred during the time segment 114.

In accordance with one or more implementations, nodes 116 are received as part of network data 108 with corresponding information describing at least one attribute for the node. For instance, in an example scenario where a node 116 represents a computing device, the network data 108 includes information describing attributes of the computing device, such as a device type, a serial number, a version of software implemented by the computing device, and so forth. As another example, for a node 116 representing a user profile, the network data 108 may include information describing node attributes such as a name or other identifier of an individual associated with the user profile, an age of the individual, a geographic location associated with the user profile, a gender of the individual associated with the user profile, an educational or workplace institution associated with the user profile, and so forth.

In this manner, specific entities, information, and connections represented by each of the nodes 116 and edges 118 of the network data 108 is constrained only by a source network from which the network data 108 was received. For instance, network data 108 received from a social networking platform predominantly comprising nodes 116 representing user profiles and edges 118 representing likes, comments, shares, and so forth between different user profiles differs from network data 108 received from a mobile service provider platform where nodes 116 represent different computing devices and physical locations and edges 118 represent calls, messages, and the like between different computing devices as well as physical proximities of the different computing devices to the physical locations. Using the techniques described herein, the network representation system 104 is configured to accommodate such disparate network data 108 and generate network embeddings 110 that map the noes 116 and edges 118 to a common latent space.

The prediction 112 generated by the prediction system 106 from the network embeddings 110 depends on a particular prediction or classification model implemented by the prediction system 106. The prediction 112 specifies one or more of a transmission path 120 or a node attribute 122 for the network data 108. The transmission path 120 is representative of one or more edges 118 that are predicted to occur in the future (e.g., one or more edges 118 not included in the network data 108). The node attribute 122 is representative of an estimated attribute for one of the nodes 116 in the network data 108, where the node attribute 122 represents information that was not included in the network data 108 describing one of the nodes 116.

To generate the network embeddings 110, the network representation system 104 employs a graph time-series module 124, a temporal modeling module 126, an embedding module 128, and a time-series summarization (T-SS) module 130. The graph-time series module 124, the temporal modeling module 126, the embedding module 128, and the T-SS module 130 are each implemented at least partially in hardware of the computing device 102 (e.g., through use of a processing system and computer-readable storage media), as described in further detail below with respect to FIG. 8.

The graph time-series module 124 is configured to generate one or more graph time-series representations of the network data 108. As described in further detail below with respect to FIGS. 2 and 3, the graph time-series representation(s) generated by the graph time-series module 124 are constrained to encompass one of a fixed duration of time (e.g., a portion or entirety of the time segment 114) or a fixed number of edges (e.g., a designated subset number of edges 118 included in the network data 108). When generating a graph time-series representation constrained by a time interval, the graph time-series representation includes all edges 118 included in the network data that were observed during the time interval. Conversely, when generating a graph time-series representation constrained by a number of edges, the graph time-series representation includes the fixed number of edges without being restricted to encompass a certain duration of the time segment 114.

In certain implementations, by generating graph time-series representations of the network data constrained by a number of edges included in the graph time-series representation, the graph time-series module 124 reduces ambiguities in the resulting network embeddings 110 resulting from structural changes in the network data 108 over time that otherwise exist when generating the resulting network embeddings 110 from graph time-series representations constrained by time.

The temporal modeling module 126 is configured to generate, from the graph time-series representation(s), a temporal graph of the network data. To do so, the temporal modeling module 126 is configured to implement a model that incorporates temporal dependencies into the graph-time series representation(s) to learn time-dependent embeddings for nodes 116 and/or edges 118 included in the network data. In some implementations, the temporal modeling module 126 generates a temporal reachability graph for the network data 108. The temporal reachability graph representing the network data 108 includes at least one edge that directly links two of the nodes 116 that were not directly linked via one of the edges 118 included in the network data. By adding such an edge, the temporal reachability graph for the network data 108 represents a feasible transmission path between two of the nodes 116 during a specified time interval, thereby providing additional contextual information regarding relationships between the nodes 116 not explicitly set forth in the network data 108. Additional details regarding generation of a temporal reachability graph and other example temporal graphs generated by the temporal modeling module are described in further detail below with respect to FIGS. 2 and 4.

The embedding module 128 is configured to derive a time-series of network embeddings from the temporal graph generated by the temporal modeling module 126. To do so, the embedding module 128 employs an embedding model that is dependent on a task or objective for which the time-series of network embeddings are to be used (e.g., a type of prediction to be generated for the network data 108). For instance, the embedding module 128 is configured to employ a community/proximity-based embedding model, a role-based embedding model, a hybrid embedding model based on structural similarity of node-central subgraphs, combinations thereof, and so forth. Notably, the embedding module 128 is configured to employ any type of existing static embedding method, as the temporal graph 214 generated using the techniques described herein is both generic and expressive to degrees that enable derivation of network embeddings by static embedding methods. The time-series of network embeddings output by the embedding module 128 are representative of an example instance of the network embeddings 110.

The T-SS module 130 is configured to further process the time-series of network embeddings output by the embedding model 128 to improve a predictive performance of the prediction system 106. For instance, in an example scenario where the network data 108 is received by the computing device 102 as a continuous stream of time segments 114, the graph time-series module 124 is configured to generate a plurality of graph time-series representations that represent segments of the continuous stream. The temporal modeling module 126 is configured to generate a temporal graph for each of the plurality of graph time-series representations, which in turn are used by the embedding module 128 to generate a plurality of time-series of network embeddings. The T-SS module 130 is configured to temporally weight embeddings by concatenating or aggregating the plurality of time-series of network embeddings for use in temporal prediction tasks. The T-SS module's 130 processing of the time-series of network embeddings generated by the embedding module 128 is optional, and thus both the time-series of network embeddings generated by the embedding module 128 as well as the aggregated or concatenated network embeddings output by the TS-S module 130 are examples of the network embeddings 110 generated by the network representation system 104.

To generate the prediction 112 from the network embeddings 110, the prediction system 106 employs a prediction module 132. The prediction module 132 is configured to implement a prediction model configured for a particular task or objective and cause the prediction model to generate prediction 112 by providing the network embeddings 110 as input to the prediction model. For instance, to generate the transmission path 120 prediction, the prediction module 132 is configured to implement a link prediction model that outputs predictions of future edges 118 between nodes 116 when provided the network embeddings 110 as input. In another example, to generate the node attribute 122 prediction, the prediction module 132 is configured to implement an entity attribute prediction model that outputs predictions of at least one attribute value for one or more of the nodes 116 when provided the network embeddings 110 as input.

Accordingly, the prediction system 106 is configured to implement the network embeddings 110 generated by the network representation system 104 to output predictions that indicate at least one of a missing attribute value not included in the network data 108 or a future edge 118 between nodes 116 of the network. In this manner, the techniques described herein enable generating a prediction by leveraging network data 108 obtained from a particular network data source 134 (e.g., a social networking platform, a mobile service provider, a web server, etc.) or from a plurality of different network data sources 134, collectively represented as network 136.

Having considered an example digital medium environment, consider now a discussion of an example system useable to generate network embeddings 110 and generate a prediction 112 in accordance with aspects of the disclosure herein.

Figure 2:
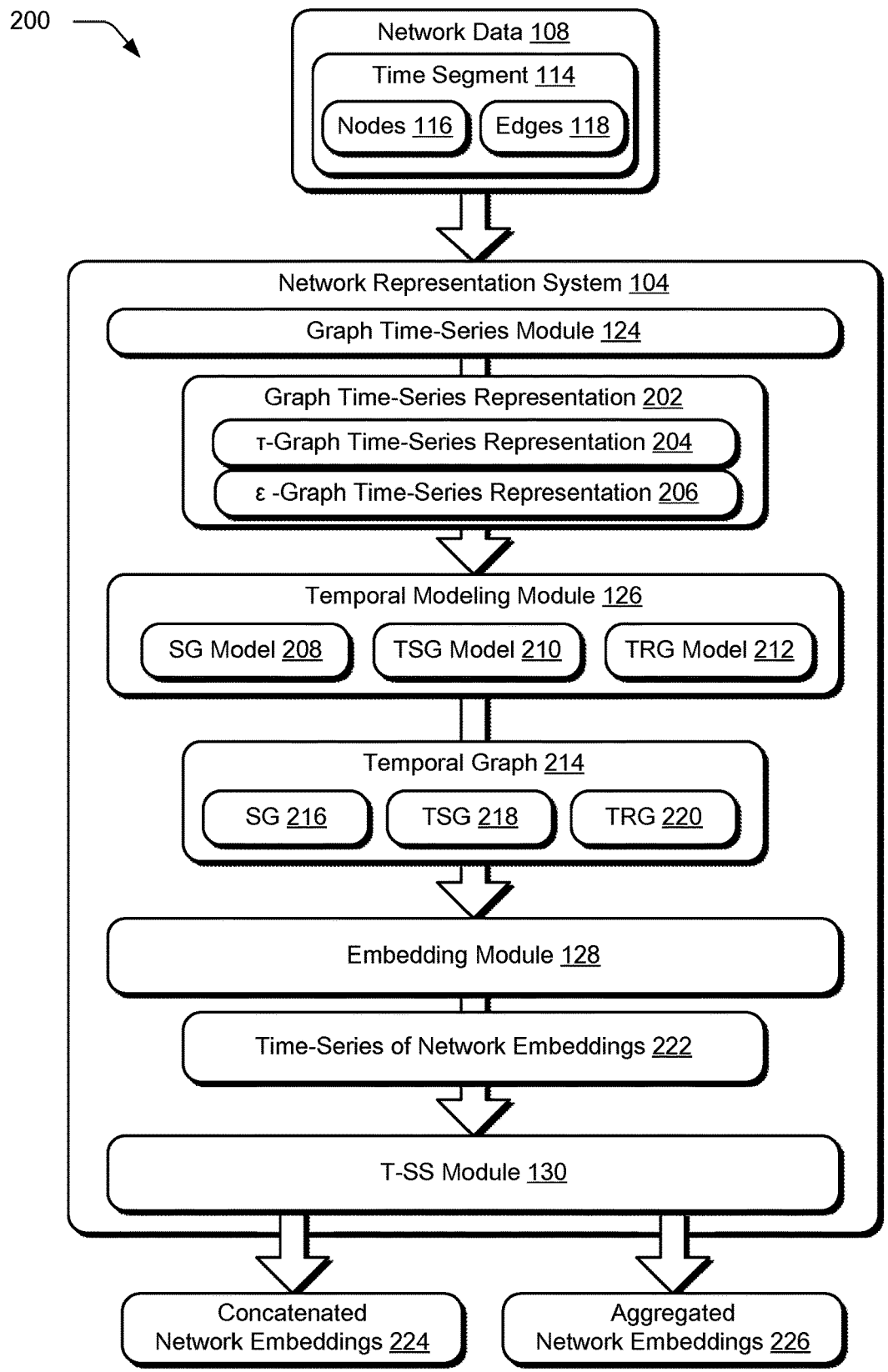
FIG. 2 illustrates an example implementation in which the network representation system of FIG. 1 generates network embeddings for network data using techniques described herein.

FIG. 2 illustrates an example system 200 useable to generate network embeddings 110 for network data 108 using the techniques described herein. In the illustrated example, system 200 includes modules of the network representation system 104 as described with respect to FIG. 1, e.g., the graph time-series module 124, the temporal modeling module 126, the embedding module 128, and the T-SS module 130. System 200 is configured to be implemented on a single computing device (e.g., computing device 102 of FIG. 1) or a combination of multiple computing devices, as described in further detail below with respect to FIG. 8.

In the example system 200, the graph time-series module 124 is configured to receive at least one time segment 114 of network data 108, where the time segment 114 includes information describing nodes 116 and edges 118 observed by one or more networks during a time period constrained by the time segment 114. In some implementations, the network data 108 is received as a temporal graph, which is a graphical representation of the nodes 116 and edges 118. In the temporal graph, timestamps of the edges 118 are represented as specific time values that describe a temporal occurrence of the edge 118 connecting two of the nodes 116. In the temporal graph, nodes 116 are represented as V. The edges 118, E, between nodes 116 are represented as $E \subseteq V \times V \times \mathbb{R}^+$. Each edge 118 is represented as (u,v,t), where u and v represent nodes 116 connected by the edge, and t denotes a time at which the connection occurred, where $t \in \mathbb{R}^+$. The time segment 114 of the network data 108 is thus represented by G=(V,E).

The graph time-series module 124 is configured to analyze the network data 108 to identify one or more temporal walks within the temporal graph representation of the network data 108. In a temporal graph, a temporal walk describes a transmission path among nodes 116 of the graph that is constrained by time. For instance, in an example scenario where an edge 118 between nodes u and w represents a transfer of data between two entities, a temporal walk represents a feasible route for transferring that data. In this manner, a temporal walk from node u to vertex w in the temporal graph G is a sequence of edges $e_1, \ldots e_k$, such that $e_1=(u_1,u_2,t_1), \ldots, e_k=(u_k,u_{k+1},t_k)$ where $t_j<t_{j+1}$ for all j=1 to k.

If a temporal walk exists between nodes 116, the nodes 116 are temporally connected. By constraining paths between nodes with respect to time, temporal walks are constrained to follow the directionality of time. In order to generate the network embeddings 110 from the network data 108, the graph time-series module 124 is configured to generate at least one graph time-series representation 202 of the nodes 116 and edges 118 included in the time segment 114. The graph time-series module 124 is configured to generate the graph time-series representation 202 as either a τ-graph time-series representation 204 or an ϵ-graph time-series representation 206.

Given time segment 114 of the network data 108, G=(V, E), where E is representative of a continuous stream of timestamped edges 118 $e_1, e_2, e_3, \ldots, e_{t-1}, e_t, \ldots$, a τ-graph time-series representation 204 of the temporal graph is defined as $G^T=\{G_1, \ldots, G_k, \ldots, G_t\}$. In the τ-graph time-series representation 204 of G, $G_1$ consists of all edges 118 within a first time scale, or period, denoted "s," $G_2$ consists of all edges within a second time period s, and so forth. The time scale represented by the τ-graph time-series representation 204 is configured to encompass all or a portion of the duration encompassed by time segment 114. In this manner, if $t_0$ denotes the timestamp of the first edge 118 in the stream of timestamped edges represented by the temporal graph G, where τ represents the period or time-scale represented by G (e.g., one hour, one day, one month, etc.), then the edges $E_k$ represented in $G_k$ are defined according to Equation 1:

$$E_k = \{(i,j,t) \in E | t_0 + k\tau > t \geq t_0 + (k-1)\tau\} \quad (\text{Eq. 1})$$

Consequently, the τ-graph time-series representation 204 corresponds to a time-series of graphs representing a stream of timestamped edges, where each of the time-series of graphs spans a common duration (e.g., a same time-scale or period) and the stream of timestamped edges represented in each of the time-series of graphs includes those edges having associated timestamps that occur during the duration bounded by the graph time-series representation 202. In this manner, when configured as a τ-graph time-series representation 204, an amount of edges included in $G_1$ are configured to differ with respect to an amount of edges included in $G_2$, and so forth.

In contrast to a τ-graph time-series representation 204, which represents all edges observed over a specified duration of time (e.g., a segment of the time segment 114), an ϵ-graph time-series representation 204 refers to a representation of G=(V,E) defined as $G^\epsilon = \{G_1, \ldots, G_k, \ldots, G_t\}$, where each $G_k$ includes a fixed number of the edges 118 (e.g., ϵ edges). In this manner, $|E_k|=\epsilon$, $\forall k$. Stated differently, ϵ denotes a fixed number of temporal edges in the time-ordered stream of edges represented by E, $|E_k|=\epsilon$ for all k=1, 2, . . . , and so forth. As such, $G_1=(E,V)$ consists of the first ϵ edges 118 $E_1=\{e_1, e_2, \ldots, e_\epsilon\}$. Extrapolating, $G_2$ consists of the next ϵ edges 118 $E_2=\{e_{\epsilon+1}, e_{\epsilon+2}, e_{2\epsilon}\}$, and so forth. Accordingly, $E_t$ is defined according to Equation 2 for an ϵ-graph time-series representation 206.

$$E_t = \bigcup_{i=(t-1)\epsilon+1}^{t\epsilon} e_i = \{e_{(t-1)\epsilon+1}, \ldots, e_{t\epsilon}\} \quad (\text{Eq. 2})$$

By modeling G=(V,E) using the ϵ-graph time-series representation 206, each graph time-series $G_k$ includes a common, fixed number of edges. Fixing a number of edges 118 represented using the ϵ-graph time-series representation 206 advantageously enables the graph-time series module 124 to control structural properties otherwise not enabled by the τ-graph time-series representation 204. For instance, because a number of represented edges 118 remain constant over different ϵ-graph time-series representations 206, embeddings learned from $E_t$ are relatively similar, due to being learned from the same number of edges 118. In contrast, the τ-graph time-series representation 204 introduces uncertainty regarding whether a difference in embeddings between adjacent time-series (e.g., from t to t+1) is due to the number of edges 118 represented in different τ-graph time-series representations 204 for t and t+1, or whether the difference in embeddings is due to changes in network structure over time (e.g., due to changes in a number of nodes 116 observed during the durations encompassed by t and t+1.

Figure 3:
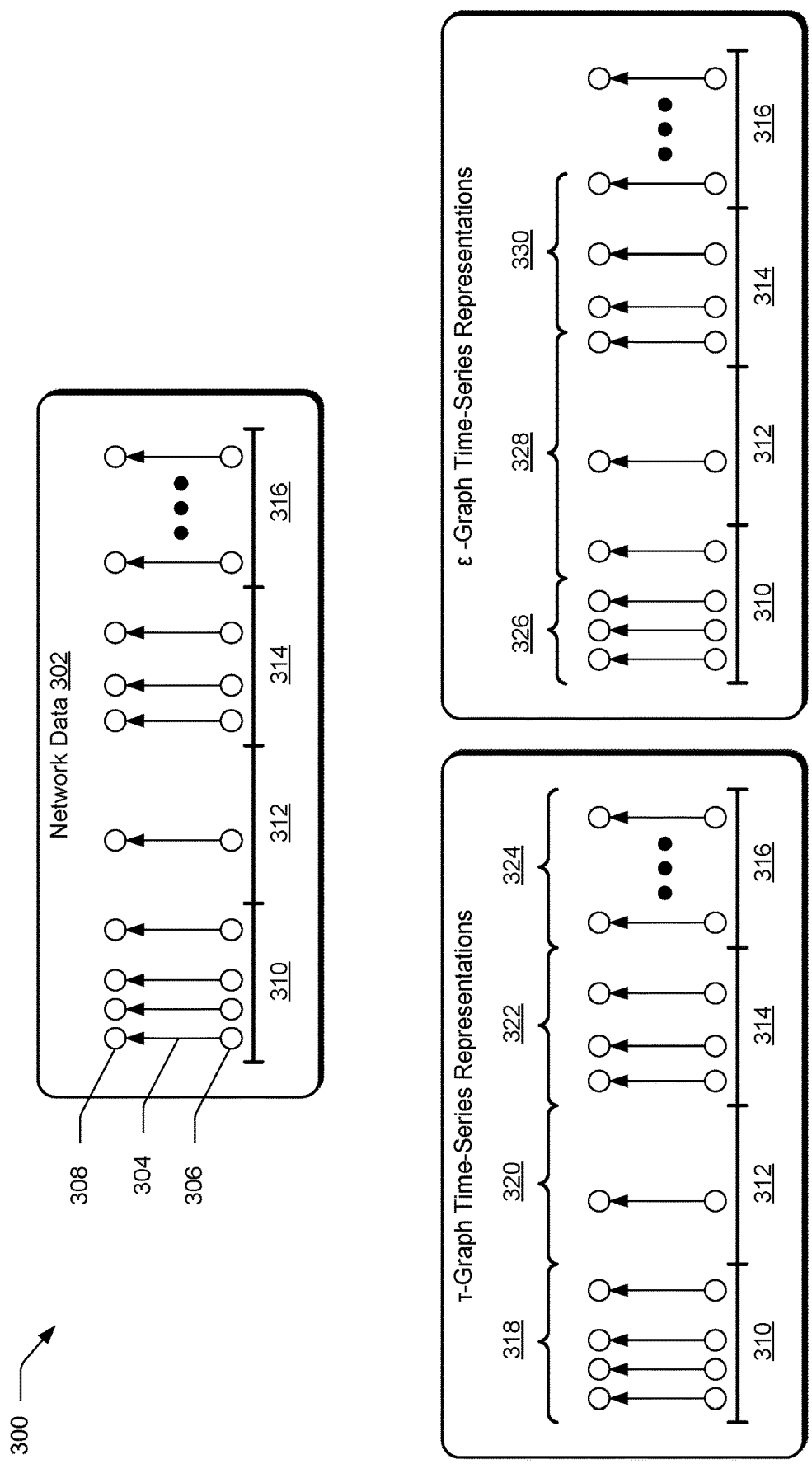
FIG. 3 illustrates example implementations of graph time-series representations of network data generated by the network representation system of FIG. 1.

FIG. 3 illustrates an example implementation 300 of an example graphical representation of network data 108 along with an example τ-graph time-series representation 204 and example ϵ-graph time-series representation 206 derived from the network data 108. In the example implementation 300, network data 302 illustrates an example graphical representation of network data 108. Network data 302 illustrates a plurality of edges 304, depicted as arrows, connecting nodes 306 and 308, depicted as circles. The arrow of each edge 304 represents a directionality of a connection between nodes 306 and 306, where node 306 represents a source node and node 308 represents a destination node. For instance, in an example scenario where edge 304 represents a transfer of data (e.g., a phone call, an email, etc.) edge 304 indicates that the data was transferred from node 306 to node 308. The network data 302 is further illustrated as segmented into a plurality of time intervals 310, 312, 314, and 316. Each time interval 310, 312, 314, and 316 corresponds to all or a portion of the time segment 114.

Example τ-graph time-series representations 204 derived from the network data 302 are characterized by representations 318, 320, 322, and 324. As evidenced by the illustrated example 300, the different τ-graph time-series representations 318, 320, 322, and 324 each span an equivalent time duration (e.g., each of the τ-graph time-series representations 318, 320, 322, and 324 encompass a corresponding one of the time intervals 310, 312, 314, and 316. As such, a τ-graph time-series representation 204 of network data 108 is constrained by a time interval and includes information specifying all nodes 116 and edges 118 included in the network data 108 within the time interval. In this manner, an amount of edges included in one τ-graph time-series representation 204 is variable with respect to amount of edges included in another τ-graph time-series representation 204, even when the τ-graph time-series representations 204 are derived from the same network data 108. For instance, representation 318 includes four edges, representation 320 includes one edge, representation 322 includes three edges, and so forth.

In contrast to a τ-graph time-series representation 204, an ϵ-graph time-series representation 206 is constrained based on a number of edges 118 included in the representation. For instance, example ϵ-graph time-series representations 206 derived from the network data 302 are characterized by representations 326, 328, and 330. As evidenced in the illustrated example 300, the different ϵ-graph time-series representations 326 are configured to encompass a specified number of edges (e.g., 3 edges in the illustrated example 300) without constraint to durations of time during which the edges occurred in network data 302.

For instance, ϵ-graph time-series representation 326 encompasses only a portion of the time interval 310, while ϵ-graph time-series representation 328 encompasses an entirety of time duration 312 and portions of time durations 310 and 314. ϵ-graph time-series representation 330 encompasses portions of time durations 314 and 316. Fixing a number of edges 118 represented using the ϵ-graph time-series representation 206 advantageously enables the graph-time series module 124 to control structural properties otherwise not enabled by the τ-graph time-series representation 204, which creates uncertainty regarding whether resulting network embeddings 110 from temporally adjacent τ-graph time-series representation 204 result from different edges included in the different τ-graph time-series representations 204 or from actual changes in a network structure represented by network data 108.

Returning to FIG. 2, given the at least one graph time-series representation 202 for the time segment 114, the temporal modeling module 126 is configured to generate a temporal graph 214 of the network data 108 by employing a temporal network model. The temporal network model employed by the temporal modeling module 126 is a model that incorporates temporal dependencies (e.g., temporal walk constraints) into the graph time-series representations 202 to learn time-dependent embeddings for entities represented by nodes 116. The temporal modeling module 126 is configured to implement any such temporal network model, such as a snapshot graph (SG) model 208, a temporal summary graph (TSG) model 210, or a temporal reachability graph (TRG) model 212. Although the SG model 208, the TSG model 210, and the TRG model 212 are described herein as examples to provide context regarding functionality of the temporal modeling module 126, the temporal network model employed by the temporal modeling module 126 is not restricted to these example models.

The SG model 208 leverages one of the τ-graph time-series representation 204 or ϵ-graph time-series representation 206 directly, without encoding any additional temporal information into the representation. In this manner, the existing temporal information (e.g., the timestamps) associated with the edges 118 in a graph $G_t$ are effectively discarded. Stated differently, the sequential connections or interactions between nodes 116, represented by edges 118, in the graph $G_t$ are ignored. Rather, the snapshot graph model incorporates temporal dependencies at the time-series level of the graph. For instance, $G_{t-1}$ is known to occur prior to $G_t$. In this manner, the temporal graph 214 generated by the SG model 208 is a snapshot graph (SG) 216, where each SG 216 represents a corresponding graph time-series representation 202 from which it was generated. Temporal information for the network data 108 is thus gleaned by considering a series of SGs 216.

In contrast to the SG model 208 approach, a TSG model 210 incorporates temporal dependencies from the τ-graph time-series representation 204 or ϵ-graph time-series representation 206 by assigning edges 118 mathematical weights based on a timestamp associated with the edge 118. Specifically, the TSG model 210 assigns more recent edges 118 larger mathematical weights relative to edges that occurred further in the past. To do so, the TSG model 210 generates a time-series of adjacency matrices $A_1, A_2, A_3, \ldots, A_t, \ldots, A_T$ from the τ-graph time-series representation 204 or ϵ-graph time-series representation 206, where $A_t(i,j)$ denotes the (i,j) entry of $A_t$. Operation of a weighted TSG model 210 is thus defined according to Equation 3.

$$S = \sum_{t=1}^{T} f(A_t, \alpha) \quad \text{(Eq. 3)}$$

In Equation 3, f represents a decay function configured to temporally weight the edges represented in the graph time-series representation 202 input to the TSG model 210. α represents a decay factor ranging in (0,1), T represents the total number of graphs included in the graph time-series representation 202, and S is the weighted temporal summary graph (TSG) 218 output by the TSG model 210. In accordance with one or more implementations, f represents an exponential decay function, such that the weighted TSG 218 is represented by Equation 4.

$$S = \sum_{t=1}^{T} (1-\alpha)^{T-t} A_t \quad \text{(Eq. 4)}$$

Because the weight for an edge (i,j) 118 is represented as $S(i,j) = \sum_{t=1}^{T} (1-\alpha)^{T-t} A_t(i,j)$ the weighted TSG S 218 is represented by Equation 5.

$$S = (1-\alpha)^{T-1} A_1 + (1-\alpha)^{T-2} A_2 + \ldots + (1-\alpha) A_{t-1} + A_t \quad \text{(Eq. 5)}$$

In this manner, the TSG model 210 is configured to leverage either the τ-graph time-series representation 204 or ϵ-graph time-series representation 206 output by the graph time-series module 124.

In some implementations, the TSG model 210 is configured to leverage fewer than all available graphs included in the graph time-series representation 202. For instance, the TSG model 210 is configured to leverage only the L most recent graphs represented in the graph time-series representation 202. In one example, the TSG model 210 considers only the L most recent graphs represented in the graph time-series representation 202 when the network data 108 is received as a continuous stream of different time segments 114 and a graph time-series representation 202 is generated for each time segment 114.

For instance, consider an example scenario where the TSG model 210 receives an ϵ-graph time-series representation 206 including T graphs from the graph time-series module 126. In this example scenario, the ϵ-graph time-series representation 206 is represented as $G^{\epsilon} = \{G_t\}_{t=1}^{T} = \{G_1, \ldots, G_T\}$. Instead of using all T graphs, leveraging only the most recent L graphs is described as considering the graphs of $G^{\epsilon}$ as designated by Equation 6.

$$G^{\epsilon} = \{G_t\}_{t=T-L+1}^{T} = \{G_{T-L+1}, \ldots, G_T\} \quad \text{(Eq. 6)}$$

By leveraging only the most recent graphs, the TSG model 210 disregards edges 118 representing connections established between nodes 116 further in the past (e.g., edges 118 occurring prior to edges represented in the L most recent graphs). This consideration of only the L most recent graphs is not restricted to the TSG model 210, and in some implementations is implemented by one or more different models employed by the temporal modeling module 214.

One example of another such model is a temporal reachability graph (TRG) model 212. The TRG model 212 is configured to derive a graph from the timestamped edge stream as represented by the τ-graph time-series representation 204 or ϵ-graph time-series representation 206. Notably, the TRG model 212 is configured to add a link between two nodes 116 if the nodes are temporally connected (e.g., if there is a temporal walk from one node to the other). In this manner, if the τ-graph time-series representation 204 or ϵ-graph time-series representation 206 indicates the existence of a temporal walk from node u to node v, the TRG model 212 generates a temporal reachability graph (TRG) 220 that includes an edge connecting node u to node v.

In this manner, for a given interval $I \in \mathbb{R}^+$ (e.g., all or a portion of time segment 114), the TRG 220 for the interval is defined as $G_R = (V, E_R)$, such that the TRG 220 s a directed graph where an edge $(u,v) \in E_R$ in the TRG 220 denotes the existence of a temporal walk leaving u and arriving at v during the interval I. The number of edges included in the interval I are denoted as ω and defined by the τ-graph time-series representation 204 or ϵ-graph time-series representation 206 received from the graph time-series module 124.

In this manner, the TRG 220 generated by the TRG model 212 is a static, unweighted graph where each edge between nodes in the graph represents a temporally-valid walk beginning at the source node and reaching the destination node. While the TRG 220 preserves temporal limitations, it fails to represent a strength of reachability, such as an amount of time required to complete the temporally-valid walk from a source node to a destination node.

To account for node reachability strength, or the amount of time required to complete temporally-valid walks from source to destination nodes 116, the TRG model 212 is configured to generate a weighted TRG 220 that represents a strength of reachability from one node to another by graph weights. To do so, the strength of reachability between a pair of nodes (i,j) 116 is defined as a function of both the number of temporally-valid paths between the node pair and the timestamp difference required to complete the temporally-valid paths. In accordance with one or more implementations, the weighting function implemented by the TRG model 212 in generating the weighted temporal reachability graph is represented by Equation 7.

$$g_{i,j} = \sum_{w \in W} e^{-(\Delta L_{i,j}|w)} \quad \text{(Eq. 7)}$$

In Equation 7, w represents a specific temporally-valid walk from node i to node j, and $\Delta t_{i,j}$ is representative of the temporal delay involved in reaching j from i along that specific temporally-valid walk. In this manner, an example implementation of deriving the weighted temporal reachability graph is performed according to the process set forth below in Algorithm 1.

Central to the operation of Algorithm 1 is the concept of a temporally-reachable neighborhood for a given node 116. For instance, for a node i, the temporally-reachable neighborhood $N_i^R$ includes nodes that can be reached by i during a specified interval and records timestamps associated with temporal paths connecting i to other nodes. Specifically, the temporally-reachable neighborhood $N_i^R$ for node i is defined as the set of tuples $\{(j,t_j)\}$, where j represents a node that is reachable from i following a temporally-valid walk and $t_j$ represents the timestamp of the edge reaching j from i in that temporally-valid walk.

As noted below in Algorithm 1, given an input temporal edge (i,j,t), the set of reachable neighbors set forth in the temporally-reachable neighborhood $N_i^R$ are looped through to add edges in the weighted TRG 220 in the manner set forth in Equation 7, as set forth in lines 5-8 of Algorithm 1. Algorithm 1 further adds (i,j) to the weighted TRG 220 along with the immediate weight, as set forth in lines 9-11.

---

Algorithm 1

1: procedure Temporal Reachability Graph (G = (V, E))
2:  Set $E_R = \emptyset$
3:  Sort $E_T$ in reverse time order
4:  while next edge (i, j, t) ∈ E do
5:   for (k, $t_k$) ∈ $N_j^R$ do
6:    $E_R \leftarrow E_R \cup \{(i, k)\}$
7:    $g_{i,k} = g_{i,k} + e^{-(t_k - t)}$
8:    $N_i^R \leftarrow N_i^R \cup \{(k, t_k)\}$
9:   $E_R \leftarrow E_R \cup \{(i, j)\}$
10:  $g_{i,j} = g_{i,j} + 1$  ▷ $\Delta t_{i,j} = 0$ because i, j are adjacent
11:  $N_i^R \leftarrow N_i^R \cup \{(j, t)\}$
12: end while
13: return $G_R = (V, E_R, g)$

---

Under Algorithm 1, the number of edges in the weighted TRG 220 ($G_R$) is bounded by the number of temporally-valid walks in G. As noted above, an edge (u,v)∈$E_R$ indicates a temporally-valid walk reaching from u to v in G. However, in some implementations such an example edge corresponds to multiple unique temporal walks with different intermediate nodes connecting u to v and/or different associated timestamps. Consequently, |$E_R$| must be less than or equal to the number of temporally-valid walks in G.

As noted above, because the TRG 220 is comprised of edges 118 within the interval of window size ω, the edges in the temporal reachability graph include up to ω different temporal walks originating from a specific node i. Consequently, the number or edges originating from a node i in a weighted temporal reachability graph is bounded by the number of temporally-valid walks, which is also ω.

The temporal modeling module 126 is thus configured to generate two variants of a weighted TRG 220 using the TRG model 212, one for each of the τ-graph time-series representation and the ε-graph time-series representation generated by the graph time-series module. The temporal graphs 214 output by the temporal modeling module 126 (e.g., the SGs 216, the TSGs 218, the TRGs 220, and weighted variants thereof) derived from the graph time-series representations 202 are then passed to the embedding module 128 for use in deriving network embeddings 110 for the network data 108.

FIG. 4 illustrates an example implementation 400 of a TRG 220 derived from a graph time-series representation 202 using the techniques described herein. In the example implementation 400, temporal graph 402 represents an example instance of a time segment 114 of network data 108. Nodes 404, 406, 408, 410, and 412 are representative of nodes 116 and edges 414, 416, 418, and 420 are representative of edges 118. Each of the edges 414, 416, 418, and 420 are associated with a timestamp, indicating a temporal occurrence of the edge 118 during the time segment 114. For instance, edge 414 is illustrated as occurring at $t_1$, edge 416 is illustrated as occurring at $t_2$, edge 418 is illustrated as occurring at $t_3$, and edge 420 is illustrated as occurring at $t_4$, where $t_1 < t_2 < t_3 < t_4$.

The temporal reachability graph 422 represents an instance of a TRG 220 generated by the temporal modeling module 126 by providing the graph time-series representation 202 as input to TRG model 212. Notably, the temporal reachability graph 422 includes additional edges 424 and 426 directly linking nodes that are not directly linked in the temporal graph 402. Each additional edge included in the temporal reachability graph 422 represents a temporally valid walk between two nodes that occur within a specified interval.

For instance, assuming a specified interval of $t_0$ to $t_4$ for the temporal reachability graph 422, the temporal modeling module 126 identifies that the sequence of edges 414 and 416 as well as the sequence of edges 414 and 420 are temporally valid walks between nodes 404 and 408 and between nodes 404 and 410, respectively. As described above, because temporal walks between nodes are constrained to follow the directionality of time, an edge directly connecting nodes 404 and 412 is not added to the temporal reachability graph 422, despite the existence of a series of edges 414, 420, and 418 there between, due to edge 420 occurring subsequent to edge 418.

In some implementations, the temporal modeling module 126 is configured to generate a weighted version of the temporal reachability graph 422 by assigning mathematical weights to edges added by the TRG model 212 that were not included in the graph time-series representation 202 (e.g., edges 424 and 426). In some implementations, the weighted version of temporal reachability graph 422 is weighted to indicate a temporal closeness of added edges 424 and 426. For instance, because edge 424 requires $t_2-t_1$ to complete and edge 426 requires $t_4-t_1$ to complete, edge 424 is assigned a greater weight to indicate that node 408 is temporally closer to node 404 than node 410 to node 404.

Thus, the temporal reachability graph 422, and its weighted variant, represent examples of a temporal graph 214 generated by the temporal modeling module 126 that incorporates temporal dependencies (e.g., temporal walk constraints) into the graph time-series representations 202 to learn time-dependent embeddings for entities represented by nodes 116 and connecting edges 118.

Returning to FIG. 2, the temporal graph(s) 214 are then passed to the node/edge embedding module for combination. The embedding module 128 is configured to employ an embedding method given the temporal graph 214 as input and generate a time-series of network embeddings 222 derived from the temporal graph 214. The time-series of network embeddings 222 captures temporal dependencies represented between nodes 116, as indicated by connecting edges 118, of the network data 108 as well as temporal structural properties of the network data 108 (e.g., amounts and attributes of nodes 116 and amounts of edges 118). The particular embedding method implemented by the embedding module 128 is dependent on a particular predictive task or objective for which the time-series of network embeddings 222 are to be employed.

For instance, in some implementations the embedding model implemented by the embedding module 128 is a community/proximity-based embedding method, a role-based embedding method, or a hybrid method based on structural similarity of node-central subgraphs. Examples of community/proximity-based embedding methods include LINE, Node2vec, and Graph2Gaussian models. Examples of role-based embedding methods include struc2vec, Role2vec, and Graphwave models. An example of a hybrid method based on structural similarity of node-central subgraphs includes the Multilens embedding model. While combining the embeddings over the graph time-series representations represented by the temporal graphs 214 is performed according to a specific embedding model implemented by the embedding module 128, Algorithm 2 provides a general framework describing operation of the embedding module 128.

In Algorithm 2, line 1 corresponds to functionality performed by the graph time-series module 124. Lines 2-4 describe functionality performed by the temporal modeling module 126, and line 5 is representative of the embedding module 128 generating the time-series of network embeddings 222. Lines 6 and 7 are representative functionality optionally performed by the T-SS module 130 in generating the network embeddings 110.

---

Algorithm 2

Input: one of the τ-graph time-series representation
or the ϵ-graph time-series representation and a base
embedding method f (e.g., GraphWave, role2vec)
1:      Construct a graph time-series $G = \{G_1, G_2, ..., G_t\}$
using a graph time-series representation
output by the graph time-series module
2:      Initialize $Z_0$ to all zeroes
3:      for each $G_t \in G$ do:    ▷ for t = 1, 2, ...,
4:          Use Algorithm 1 to derive the temporal reachability graph for $G_t$
5:          Compute node embedding matrix $Z_t$ using the base embedding method f with the temporal reachability graph derived from Algorithm 1.

---

Algorithm 2 -continued

6:      Concatenate or aggregate (using sum, mean, etc.) the embedding matrix (e.g., $\bar{Z}_t = (1-\theta)\bar{Z}_{t-1} + \theta Z_t$, where $\bar{Z}_t$ represents the temporally weighted embedding using the above exponential weighting kernel $\mathbb{K}(\cdot)$ and $0 \leq \theta \leq 1$ is a hyperparameter that controls the importance of past information relative to more recent information.
7:      return $\bar{Z}_t$ (temporally weighted embeddings using $\mathbb{K}$ and $\theta$) or $Z = [Z_1 \; Z_2 \; ... Z_t]$ (concatenated embeddings).

---

As noted above, the time-series of network embeddings 222 generated by the embedding module 128 are representative of an instance of the network embeddings 110 output by the network representation system 104. In some implementations, the time-series of network embeddings 222 are further processed by the T-SS module 222 using one or more temporal fusion techniques for output as the network embeddings 110. For instance, in some implementations the T-SS module 130 generates concatenated network embeddings 224 from the time-series of network embeddings 222. To do so, given the time-series of network embeddings 222, represented as $\{Z_t\}_{t=1}^{T}$, the T-SS module 130 concatenates the network embeddings as $Z=[Z_1 \ldots Z_T]$. In some implementations, the T-SS module 130 further weights the time-series of network embeddings 222 based on time. Alternatively or additionally, the T-SS module 130 is configured to moderate the influence of the time-series of network embeddings 222 by devoting a larger embedding size to more recent embeddings and/or obtaining a low-rank approximation of embeddings that occur further in the past.

In doing so, the T-SS module 130 effectively compresses embeddings in the time-series of network embeddings 222 that occur further in the past, which preserves an integrity of the resulting network embeddings 110 because recent embeddings are of greater importance than previous embeddings when used to generate prediction 112. Additionally, compressing embeddings that occurred further in the past allows for a larger embedding dimension, thus biasing the embeddings toward more recent events occurring in network data 108 to prepare the network embeddings 110 for temporal prediction tasks. Alternatively, the T-SS module 130 is configured to generate aggregated network embeddings 226 by aggregating the time-series of network embeddings 222, such that the aggregated network embeddings 226 represent a sum, a mean, and so forth of the time-series of network embeddings 222. An example manner in which the T-SS module 130 generates the concatenated network embeddings 224 or the aggregated network embeddings 226 is set forth above in lines 6 and 7 of Algorithm 2.

The time-series of network embeddings 222, the concatenated network embeddings 224, or the aggregated network embeddings 226 are then output by the network representation system 104 as network embeddings 110 for the network data 108. Because the network embeddings 110 comprise a low-dimensional latent space representation of the network data 108, the network embeddings 110 are useable by one or more prediction models configured to output a prediction pertaining to the network data 108, such as one or more attributes for a node 116 or a future edge 118 between two or more nodes 116. Having considered example details of generating network embeddings for network data, consider now an example system to generate predictions for the network data using the network embeddings.

Figure 5:
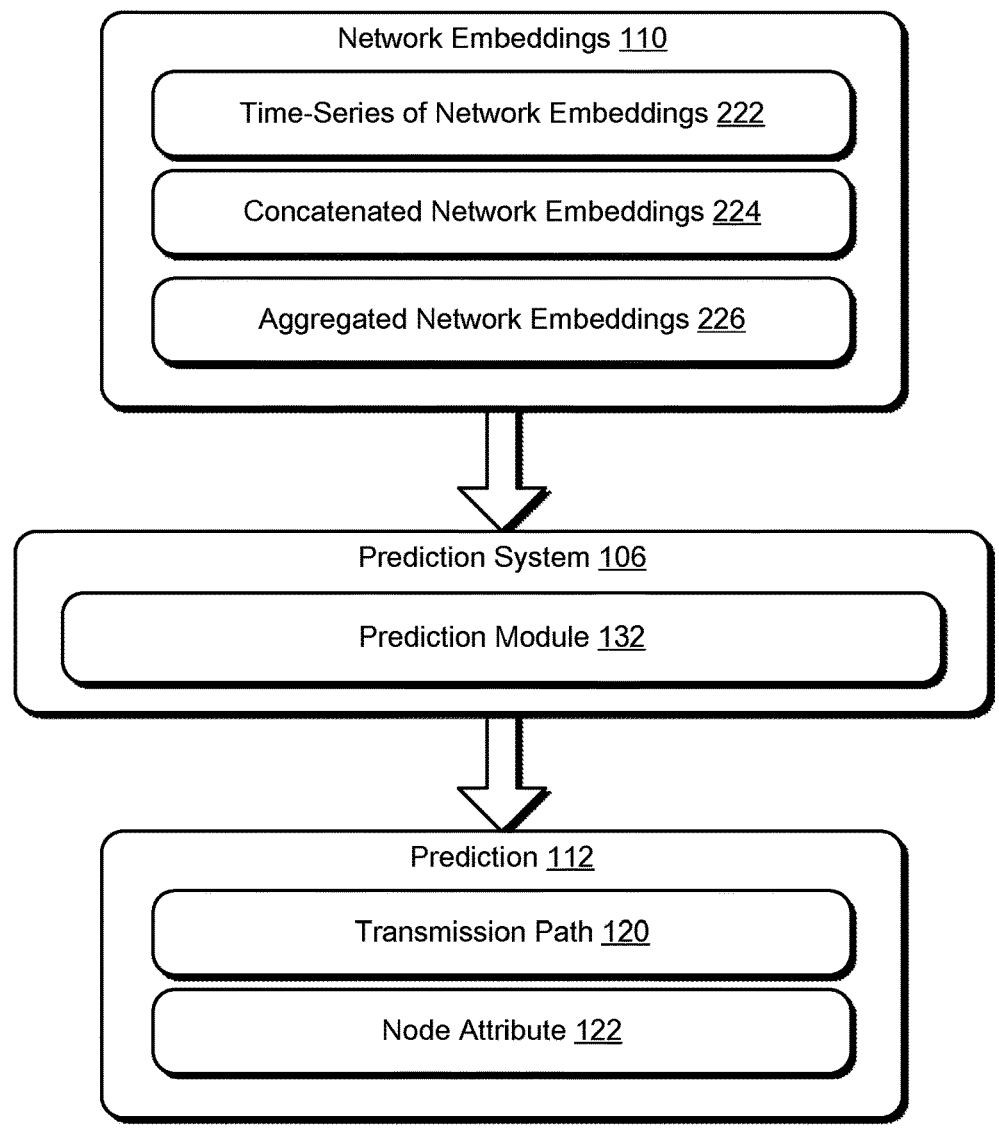
FIG. 5 illustrates an example implementation in which the prediction system of FIG. 1 generates a prediction using network embeddings for network data using techniques described herein.

FIG. 5 illustrates an example system 500 useable to generate one or more predictions 112 regarding network data 108, when provided as input with network embeddings 110 derived from the network data 108 according to the techniques described herein. In the illustrated example, system 500 includes the prediction module 132 of the prediction system 106. System 500 is configured to be implemented on a single computing device (e.g., computing device 102 of FIG. 1) or a combination of multiple computing devices, as described in further detail below with respect to FIG. 8.

The prediction module 132 is configured to implement a prediction model that has been trained to perform a particular task or objective (e.g., link prediction, node attribute prediction, and the like). Given one of the time-series of network embeddings 222, the concatenated network embeddings 224, or the aggregated network embeddings 226 output by the network representation system 104 as network embeddings 110, the prediction module 132 is configured to cause the prediction model to generate prediction 112 by providing the network embeddings 110 as input to the prediction model. Example predictions 112 output by the prediction system 106 include a transmission path 120 prediction and a node attribute 122 prediction.

While transmission path 120 predictions and a node attribute 122 predictions are described herein for exemplary purposes, the prediction 112 type output by prediction system 106 is not so limited to these example predictions. Rather, the specific type of prediction 112 generated by prediction system 106 is dependent on a specific prediction model implemented by the prediction module 132, and the prediction module 132 is configured to implement any suitable type of prediction model that is configured to output a prediction when provided network embeddings (e.g., embeddings mapping nodes and/or edges of network data to a low-dimensional latent space).

For instance, to generate the transmission path 120 prediction, the prediction module 132 is configured to implement a link prediction model that outputs predictions of future edges 118 between nodes 116 when provided the network embeddings 110 as input. Alternatively, to generate the node attribute 122 prediction, the prediction module 132 is configured to implement an entity attribute prediction model that outputs predictions of at least one attribute value for one or more of the nodes 116 when provided the network embeddings 110 as input.

In this manner, the prediction system 106 is configured to implement the network embeddings 110 generated by the network representation system 104 to output predictions that indicate at least one of a missing attribute value not included in the network data 108 or a future edge 118 between nodes 116 of the network. Accordingly, system 500 is configured to generate a prediction by leveraging network data 108 obtained from a particular network data source 134 (e.g., a social networking platform, a mobile service provider, a web server, etc.) or from a plurality of different network data sources 134, collectively represented as network 136.

Having considered example systems and techniques for generating network embeddings 110 that represent network data 108 and using the network embeddings 110 to generate one or more predictions 112 pertaining to the network data, consider now example procedures to illustrate aspects of the techniques described herein.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-5.

Figure 6:
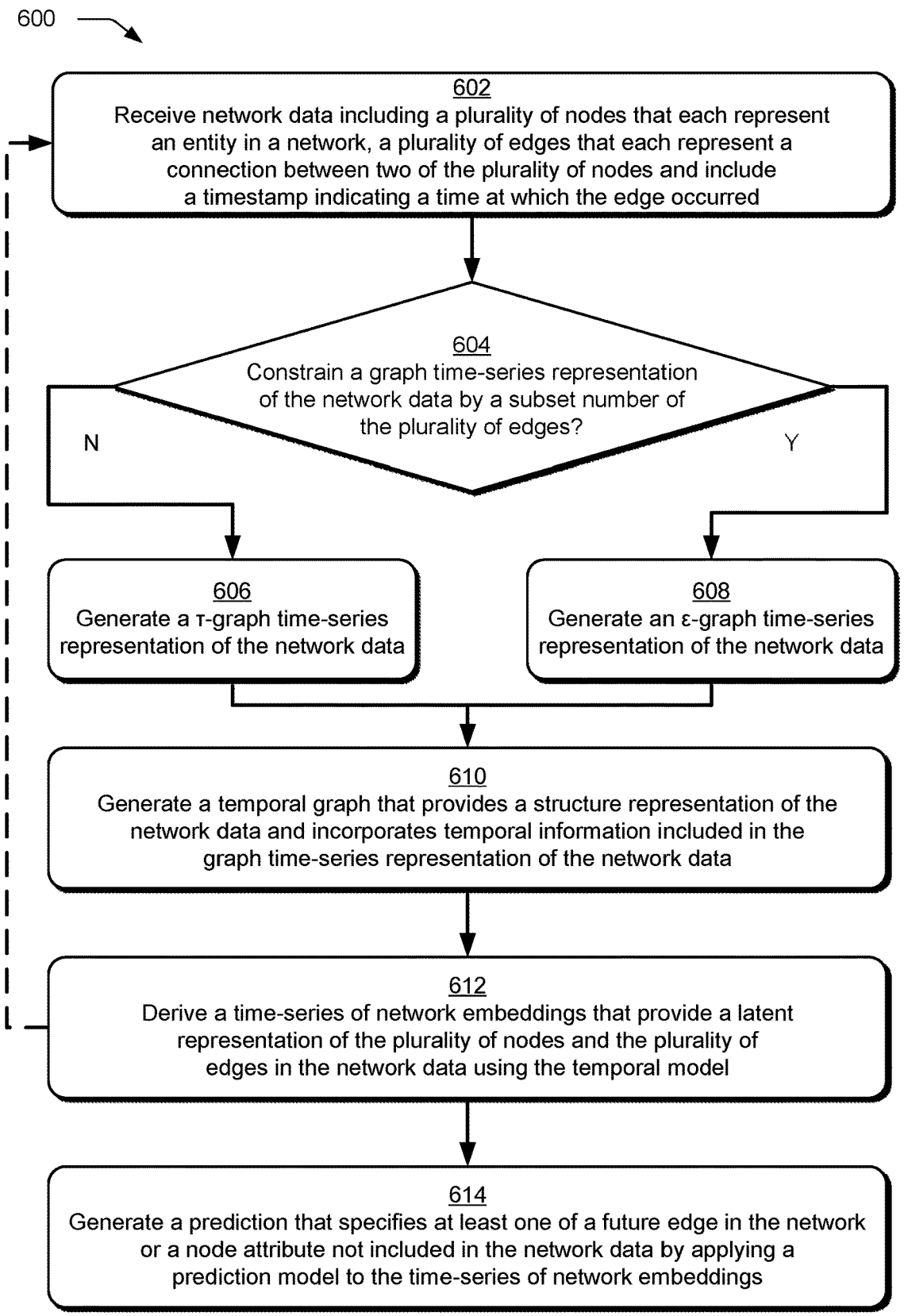
FIG. 6 is a flow diagram depicting a procedure in an example implementation for deriving network embeddings from network data and generating a prediction based on the network embeddings using techniques described herein.

FIG. 6 depicts a procedure 600 in an example implementation of deriving network embeddings that map network data to a low-dimensional latent space and generating a prediction from the network embeddings using the techniques described herein. Network data including a plurality of nodes that each represent an entity in a network and a plurality of edges that each represent a connection between two of the plurality of nodes and each include a timestamp indicating a time at which the edge occurred is received (block 602). The graph time-series module 124 of the network representation system 104, for instance, receives at least one time segment 114 of network data 108, with the time segment 114 including a plurality of nodes 116 and at least one edge 118 that represents a connection between two of the nodes 116. The network data 108 is received from one or more network data sources 134, such as a social networking platform, a mobile service provider, an educational or workplace entity, a web server, combinations thereof, and so forth.

A determination is made as to whether a graph time-series representation of the network data is to be constrained by a subset number of the plurality of edges included in the network data (block 604). The graph time-series module 124, for instance, displays a visual prompt at a display of a computing device implementing the network representation system 104 requesting user input specifying whether graph time-series representations 202 of the network data 108 is to be constrained by edges or time included in the individual graph time-series representations 202. Alternatively, the graph time-series module 124 is configured to automatically, independent of user input, determine whether the graph time-series representation of network data is to be constrained by a number of the plurality of edges 118 included in individual ones of the graph time-series representations 202. In some implementations, the graph time-series module 124 is configured to default to constraining individual graph time-series representations 202 to include a designated subset number of the plurality of edges 118 unless instructed otherwise.

Responsive to determining that the graph time-series representation of the network data is not to be constrained by a subset number of the plurality of edges, a τ-graph time-series representation of the network data is generated (block 606). The graph time-series module 124, for instance, generates the τ-graph time-series representation 204 as representing all or a portion of the time segment 114 of the network data 108. The τ-graph time-series representation 204 includes a subset of the nodes 116 that are connected by a subset of the edges 118 having associated timestamps that fall within a duration of time encompassed by the τ-graph time-series representation 204. In implementations where the τ-graph time-series representation 204 does not encompass an entirety of the time segment 114, the graph time-series module 124 is configured to generate a plurality of τ-graph time-series representations 204, each encompassing a same duration of the time segment 114, such as τ-graph time-series representations 310, 312, 314, and 316.

Alternatively, responsive to determining that the graph time-series representation of the network data is to be constrained by a subset number of the plurality of edges, an ε-graph time-series representation of the network data is generated (block 608). The graph time-series module 124, for instance, generates the ε-graph time-series representation 206 as representing a portion of the plurality of edges 118 included in the time segment 114 of the network data 108. The ε-graph time-series representation 206 includes a specified subset number of the plurality of edges 118, such that each ε-graph time-series representation 206 generated for the network data 108 includes a same number of edges, as well as the nodes 116 connected by those edges. By constraining each ε-graph time-series representation 206 based on an amount of included edges 118 rather than time, different ε-graph time-series representations 206 generated from the network data 108 are configured to encompass different durations of time. The ε-graph time-series representation 206 generated by the graph time-series module 124 is represented by one or the ε-graph time-series representations 326, 328, and 330.

A temporal graph that provides a structural representation of the network data and incorporates temporal information included in the graph time-series representation of the network data is generated (block 610). The temporal modeling module 126, for instance, generates a temporal graph 214 representation of the network data 108 that incorporates temporal information described by the graph time-series representation 202. The particular structure of the temporal graph 214 generated by the temporal modeling module 126 depends on a particular model employed by the temporal modeling module 126 in generating the temporal graph 214. For instance, when a snapshot graph model 208 is employed, the temporal graph 214 is output as a snapshot graph 216. In another example, when a temporal summary graph model 210 is employed, the temporal graph 214 is output as a temporal summary graph 218. In yet another example, when a temporal reachability graph model 212 is employed, the temporal graph 214 is configured as a temporal reachability graph 220.

In some implementations, the temporal graph 214 is generated to include weights reflecting a temporal occurrence of edges 118 represented in the temporal graph 214. For the instance, the temporal modeling module 126 is configured to assign weights to edges represented in the temporal graph 214 according to a timestamp associated with each edge (e.g., assigning greater weights to more recent edges to emphasize recent node connections in the temporal graph 214). In this manner, the temporal modeling module 126 is configured to generate weighted versions of the temporal summary graph 218 and temporal reachability graph 220 instances of the temporal graph 214.

A time-series of network embeddings that provides a latent space representation of the plurality of nodes and the plurality of edges in the network data is derived using the temporal model (block 612). The embedding module 128 is configured to employ an embedding method given the temporal graph 214 as input and generate a time-series of network embeddings 222 derived from the temporal graph 214. The time-series of network embeddings 222 captures temporal dependencies represented between nodes 116, as indicated by connecting edges 118, of the network data 108 as well as temporal structural properties of the network data 108 (e.g., amounts and attributes of nodes 116 and amounts of edges 118). The particular embedding method implemented by the embedding module 128 is dependent on a particular predictive task or objective for which the time-series of network embeddings 222 are to be employed. The time-series of network embeddings 222 generated by the embedding module 128 are representative of an instance of the network embeddings 110 output by the network representation system 104.

In some implementations, the time-series of network embeddings 222 are further processed by the T-SS module 222 using one or more temporal fusion techniques for output as the network embeddings 110. For instance, in some implementations the T-SS module 130 generates concatenated network embeddings 224 from the time-series of network embeddings 222. In some implementations, the T-SS module 130 further weights the time-series of network embeddings 222 based on time. Alternatively or additionally, the T-SS module 130 is configured to moderate the influence of the time-series of network embeddings 222 by devoting a larger embedding size to more recent embeddings and/or obtaining a low-rank approximation of embeddings that occur further in the past. Alternatively, the T-SS module 130 is configured to generate aggregated network embeddings 226 by aggregating the time-series of network embeddings 222, such that the aggregated network embeddings 226 represent a sum, a mean, and so forth of the time-series of network embeddings 222. The time-series of network embeddings 222, the concatenated network embeddings 224, or the aggregated network embeddings 226 are then output by the network representation system 104 as network embeddings 110 for the network data 108.

Procedure 600 optionally returns to block 602, as indicated by the dashed arrow returning to block 602 from 612. For instance, in an example scenario where the network data 108 is received as a continuous stream, operation returns to block 602 for generating a graph time-series representation, generating a temporal graph, and deriving network embeddings for a subsequent time segment 114 of the network data 108. Procedure 600 is configured to repeat the operations set forth in blocks 602-612 until network embeddings have been derived for an entirety of the network data 108.

A prediction that specifies at least one of a future edge in the network or a node attribute not included in the network data is generated by applying a prediction model to the time-series of network embeddings (block 614). Given one of the time-series of network embeddings 222, the concatenated network embeddings 224, or the aggregated network embeddings 226 output by the network representation system 104 as network embeddings 110, the prediction module 132 is configured to cause the prediction model to generate prediction 112 by providing the network embeddings 110 as input to the prediction model. Example predictions 112 output by the prediction system 106 include a transmission path 120 prediction and a node attribute 122 prediction.

While transmission path 120 predictions and a node attribute 122 predictions are described herein for exemplary purposes, the prediction 112 type output by prediction system 106 is not so limited to these example predictions. Rather, the specific type of prediction 112 generated by prediction system 106 is dependent on a specific prediction model implemented by the prediction module 132, and the prediction module 132 is configured to implement any suitable type of prediction model that is configured to output a prediction when provided network embeddings (e.g., embeddings mapping nodes and/or edges of network data to a low-dimensional latent space).

For instance, to generate the transmission path 120 prediction, the prediction module 132 is configured to implement a link prediction model that outputs predictions of future edges 118 between nodes 116 when provided the network embeddings 110 as input. Alternatively, to generate the node attribute 122 prediction, the prediction module 132 is configured to implement an entity attribute prediction model that outputs predictions of at least one attribute value for one or more of the nodes 116 when provided the network embeddings 110 as input.

Figure 7:
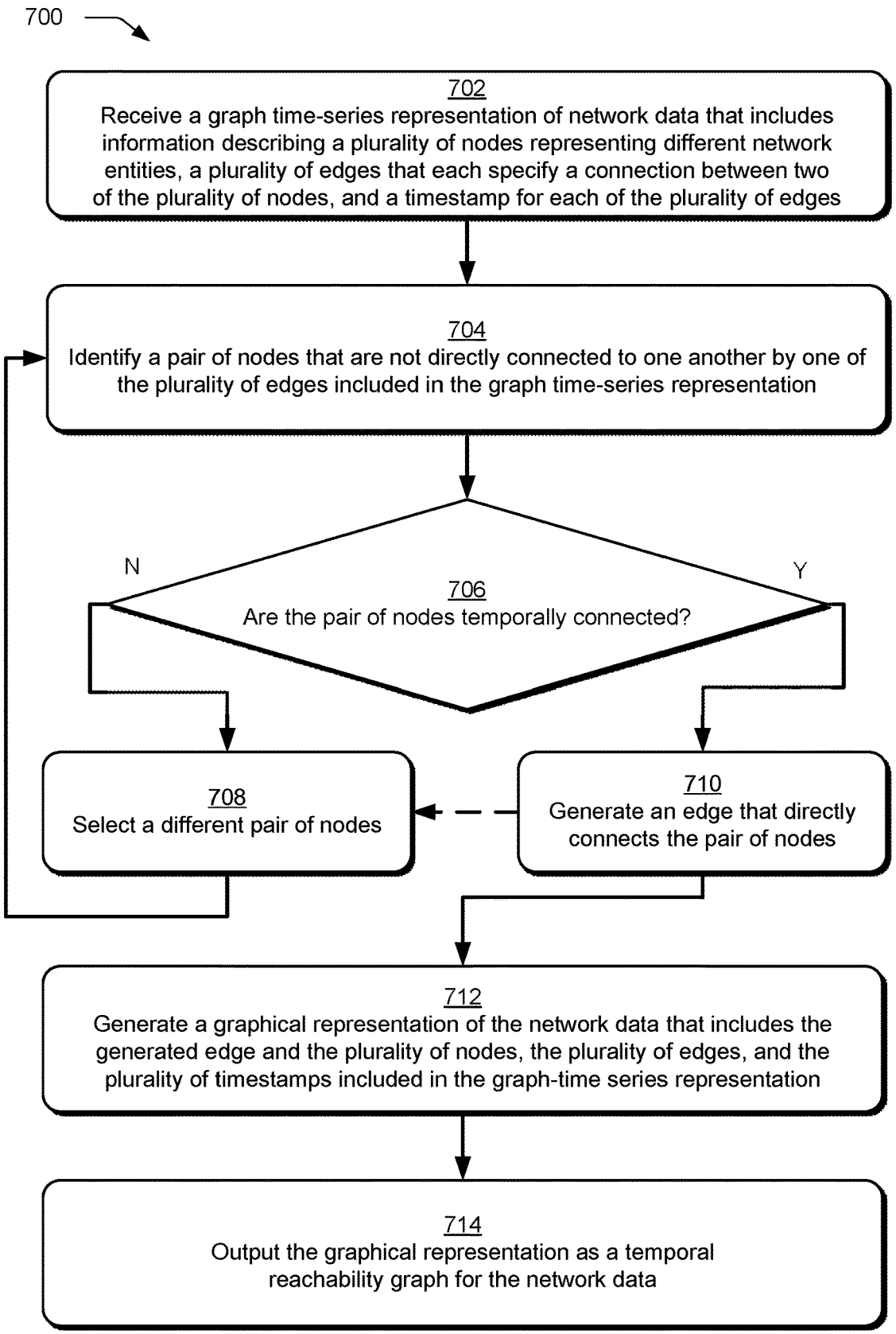
FIG. 7 is a flow diagram depicting a procedure in an example implementation for generating a temporal reachability graph representing network data using techniques described herein.

FIG. 7 depicts a procedure 700 in an example implementation of generating a temporal reachability graph that models network data while preserving temporal information associated with the network data. A graph time-series representation of network data that includes information describing a plurality of nodes representing different network entities, a plurality of edges that each specify a connection between two of the plurality of nodes, and a timestamp associated with each of the plurality of edges is received (block 702). The temporal modeling module 126, for instance, receives the graph time-series representation 202 of at least a portion of a time segment 114 of network data 108.

A pair of nodes that are not directly connected to one another by one of the plurality of edges included in the graph time-series representation is identified (block 704). The temporal modeling module 126, for instance, provides the graph time-series representation 202 as input to TRG model 212. A determination is made as to whether the pair of nodes are temporally connected (block 706). The TRG model 212 analyzes the graph time-series representation 202 to determine whether a temporal walk exists between the node pair. Responsive to determining that the node pair is not temporally connected, a different pair of nodes is selected (block 708) and operation returns to block 704.

Alternatively, in response to determining that a temporal walk exists between the node pair, an edge that directly connects the pair of nodes is generated (block 710). The TRG model 212 is configured to identify that a pair of nodes are temporally connected responsive to determining that a sequence of temporally constrained edges 118 connect the node pair during a specified time interval. For instance, responsive to determining that nodes 404 and 408 are temporally connected to one another via the sequence of edges 414 and 416, the TRG model 212 adds edge 424 that directly connects nodes 404 and 408. Similarly, responsive to determining that nodes 404 and 410 are temporally connected via the sequence of edges 414 and 420, the TRG model 212 adds edge 426 that directly connects nodes 404 and 410.

Operation then optionally moves to block 708, as indicated by the dashed arrow from block 710 to block 708. In this manner, the operations set forth in blocks 704-710 are configured to be repeated until all node pairs of the graph time-series representation 202 have been analyzed to determine whether an edge should be added to note their temporal connection. A graphical representation that includes the generated edge(s) as well as the plurality of nodes, the plurality of edges, and the plurality of timestamps included in the graph time-series representation is generated (block 712). The temporal modeling module 126, for instance, generates the temporal reachability graph 422 from a graph time-series representation 202 derived from temporal graph 402. The graphical representation is then output as a temporal reachability graph for the network data (block 714). The temporal modeling module 126, for instance, outputs the TRG 220 to embedding module 128 for use in deriving node embeddings 110 for the network data 108.

Having described example procedures in accordance with one or more implementations, consider now an example system and device that can be utilized to implement the various techniques described herein.

Example System and Device

Figure 8:
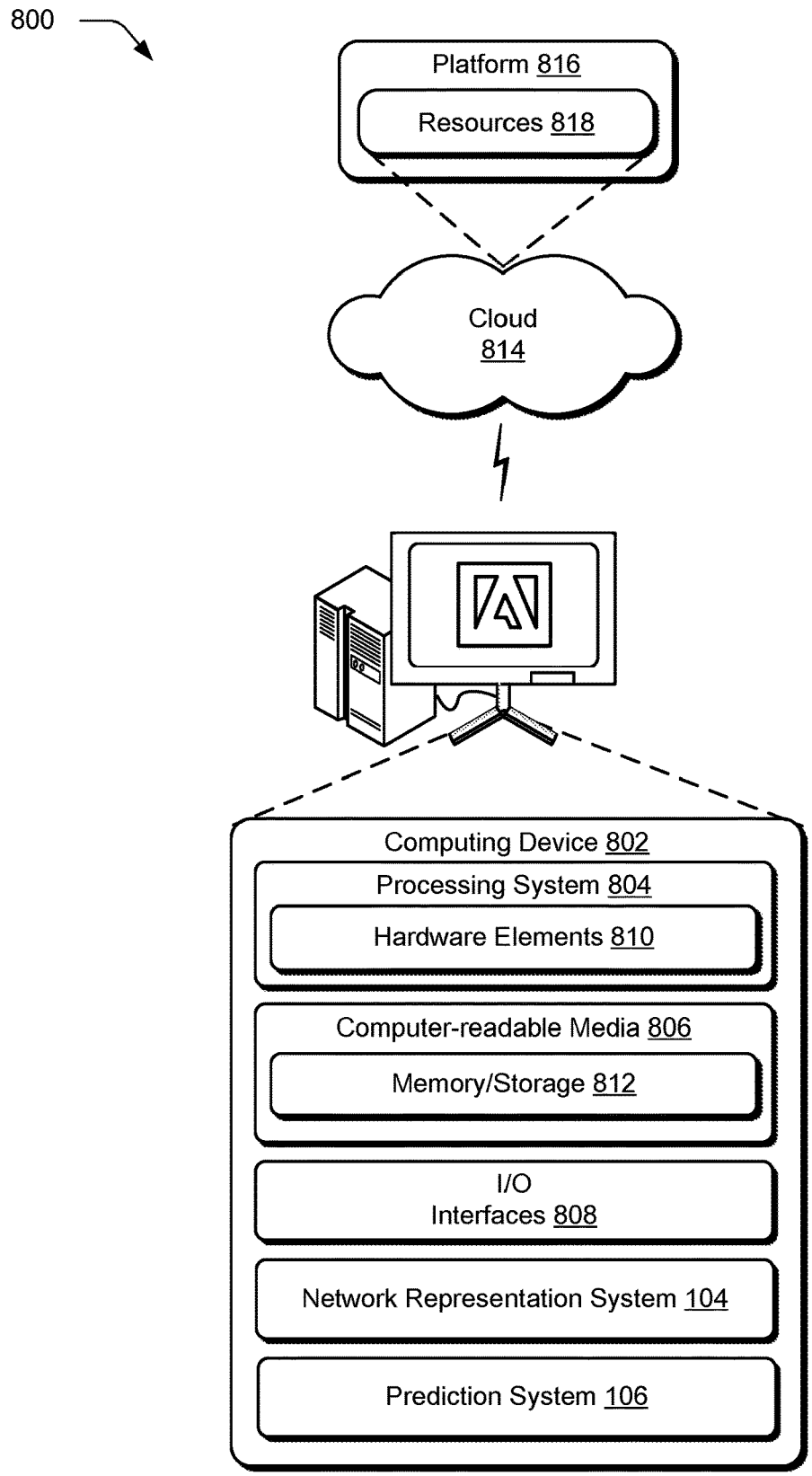
FIG. 8 illustrates an example system including various components of an example device that can be implemented as a computing device as described and/or utilized with reference to FIGS. 1-7 to implement techniques described herein.

FIG. 8 illustrates an example system generally at 800 that includes an example computing device 802 that is representative of one or more computing systems and/or devices that may implement the various techniques described herein. This is illustrated through inclusion of the network representation system 104 and the prediction system 106. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for deriving network embeddings that provide a latent representation of nodes and edges in network data for a network, a method implemented by at least one computing device, the method comprising:

receiving, by the at least one computing device, network data describing a plurality of entities and a plurality of connections that each connect a pair of the plurality of entities;

generating, by the at least one computing device, a plurality of graph time-series representations from the network data to each encompass a same number of the plurality of connections included in the network data, each of the plurality of graph time-series representations comprising a subset of the plurality of entities and a subset of the plurality of connections included in the network data;

generating, by the at least one computing device, a temporal graph of the network data based on the plurality of graph time-series representations, the temporal graph comprising a graph structure representation of the network data that incorporates temporal information described by the plurality of graph time-series representations; and deriving, by the at least one computing device, a time-series of network embeddings for the network data from the temporal graph, the time-series of network embeddings comprising a latent representation of the plurality of entities in the network data.

2. The method as recited in claim 1, wherein each of the plurality of entities represents one of a computing device, a physical location, a user profile, an Internet Protocol (IP) address, a Uniform Resource Identifier (URI) for a resource accessible via the network, a user profile, or an institution identifying a plurality of user profiles, and each of the plurality of entities is associated with one or more attribute values that describe characteristics of the entity.

3. The method as recited in claim 1, wherein each of the plurality of connections represents one of a transfer of data between the pair of the plurality of entities connected by the connection or a satisfaction of a threshold physical proximity between the pair of the plurality of entities connected by the connection.

4. The method as recited in claim 1, wherein each of the plurality of graph time-series representations are generated to encompass a fixed duration of time.

5. The method as recited in claim 1, wherein a first one of the plurality of graph time-series representations is generated to encompass a first period of time and a second one of the plurality of graph time-series representations is generated to encompass a second period of time, the first period of time encompassing a duration that is greater than or less than a duration encompassed by the second period of time.

6. The method as recited in claim 1, wherein receiving the network data comprises receiving the network data as a continuous stream of network data that describes real-time changes to the plurality of entities and the plurality of connections and each of the plurality of graph time-series representations represent an interval of the continuous stream of network data, the interval comprising one of a fixed duration or a fixed number of connections.

7. The method as recited in claim 1, wherein the temporal graph comprises a temporal summary graph that weights individual ones of the plurality of connections based on a timestamp associated with the connection.

8. The method as recited in claim 1, wherein the temporal graph comprises a temporal reachability graph that adds at least one connection between two of the plurality of entities that are not directly connected via one of the plurality of connections included in the network data.

9. The method as recited in claim 8, further comprising identifying, by the at least one computing device, the at least one connection between the two of the plurality of entities that are not directly connected via one of the plurality of connections included in the network data responsive to identifying that a sequence of the plurality of connections in the network data connect the two of the plurality of entities during a time-constrained interval.

10. The method as recited in claim 1, further comprising generating, by the at least one computing device, a prediction from the time-series of network embeddings, the prediction comprising an attribute value for one of the plurality of entities, wherein the attribute value is not included in the network data.

11. The method as recited in claim 1, further comprising generating, by the at least one computing device, a prediction from the time-series of network embeddings, the prediction comprising a transmission path that specifies at least one future connection between at least two of the plurality of entities included in the network data, wherein the at least one future connection is not included in the network data.

12. The method as recited in claim 1, wherein each of the plurality of graph time-series representations encompasses a different interval of the network data, the method further comprising: p1 performing, by the at least one computing device, the generating the temporal graph of the network data and the deriving the time-series of network embeddings for each of the plurality of graph time-series representations;

concatenating or aggregating, by the at least one computing device, the derived plurality of time-series of network embeddings; and generating, by the at least one computing device, a prediction based on the concatenated or aggregated network embeddings.

13. In a digital medium environment for generating a temporal graph of network data that adds temporally constrained connections between nodes not directly connected in the network data, a method implemented by at least one computing device, the method comprising:

receiving, by the at least one computing device, a graph time-series representation of network data, the graph time-series representation including information describing a plurality of nodes representing different entities in a network, one or more edges that each specify a connection between two of the plurality of nodes, and a timestamp associated with each of the one or more edges;

generating, by the at least one computing device, a temporal reachability graph of the network data by:
identifying a pair of nodes of the plurality of nodes that are not directly connected to one another by one of the one or more edges included in the graph time-series representation;
determining whether the pair of nodes are temporally connected; and
responsive to determining that the pair of nodes are temporally connected, generating an edge that directly connects the pair of nodes; and outputting, by the at least one computing device, the temporal reachability graph as a graphical representation of the network data that includes the plurality of nodes, the one or more edges, and the one or more timestamps included in the graph time-series representation and the edge that directly connects the pair of nodes not directly connected in the graph time-series representation.

14. The method as recited in claim 13, wherein the plurality of nodes represent a plurality of computing devices and each of the one or more edges represents a transmission of data from one of the plurality of computing devices to another one of the plurality of computing devices at a time indicated by a corresponding timestamp.

15. The method as recited in claim 13, wherein the plurality of nodes represent a plurality of computing devices and the one or more edges each indicate that one of the plurality of computing devices was within a threshold physical distance to another one of the plurality of computing devices at a time indicated by a corresponding timestamp.

16. The method as recited in claim 13, wherein determining that the pair of nodes are temporally connected comprises identifying that a sequence of at least two of the one or more edges included in the graph time-series representation connecting the pair of nodes are associated with timestamps that occur during a threshold duration.

17. The method as recited in claim 13, further comprising generating, by the at least one computing device, a weighted temporal reachability graph from the temporal reachability graph by assigning a mathematical weight to each of the one or more edges included in the temporal reachability graph based on an amount of time required to complete each edge and a number of edges in the temporal reachability graph that connect the two of the plurality of nodes connected by the edge being weighted.

18. The method as recited in claim 13, further comprising:
    deriving, by the at least one computing device, a time-series of network embeddings from the temporal reachability graph that provides a latent representation of node attributes for the plurality of nodes and a latent representation of edge attributes for the plurality of edges; and
    generating, by the at least one computing device, a prediction from the time-series of network embeddings.

19. In a digital medium environment for deriving network embeddings that provide a latent representation of nodes and edges in network data for a network, a system comprising:
    one or more processors; and
    at least one computer-readable storage medium having instructions stored thereon that are executable by the one or more processors to perform operations comprising:
        receiving network data describing a plurality of nodes that each represent an entity in a network, a plurality of connections that each represent a connection between a pair of the plurality of nodes, and a plurality of timestamps that each identify a time at which a corresponding one of the plurality of connections occurred;
        generating a plurality of graph time-series representations from the network data, each of the plurality of graph time-series representations comprising a same number subset of the plurality of connections;
        generating, for each of the plurality of graph time-series representations, a temporal reachability graph of the network data by:
            identifying a pair of nodes in the graph time-series representation that are not directly connected by one of the same number subset of the plurality of connections;
            generating an edge that directly connects the pair of nodes responsive to determining that the pair of nodes are temporally connected by a sequence of at least two of the subset of the plurality of connections; and
            outputting the temporal reachability graph as a graphical representation of the network data that includes the plurality of nodes, one or more edges, and the one or more timestamps included in the graph time-series representation and the edge that directly connects the pair of nodes not directly connected in the graph time- series representation; and
        deriving a time-series of network embeddings for the network data from the plurality of temporal reachability graphs, the time-series of network embeddings comprising a latent representation of the plurality of nodes and the one or more of edges in the network data.

20. The system as recited in claim 19, the operations further comprising generating a weighted temporal reachability graph from the temporal reachability graph by assigning a mathematical weight to each of the one or more edges based on an amount of time required to complete each edge and a number of edges in the temporal reachability graph that connect two nodes connected by the edge being weighted.

* * * * *

UNITED STATES PATENT AND TRADEMARK OFFICE
CERTIFICATE OF CORRECTION

PATENT NO. : 11,621,892 B2
APPLICATION NO. : 17/095070
DATED : April 4, 2023
INVENTOR(S) : Sungchul Kim et al.

Page 1 of 1

It is certified that error appears in the above-identified patent and that said Letters Patent is hereby corrected as shown below:

In the Claims

Column 28, Line 20, after "method further comprising:", delete "p1".

Signed and Sealed this
Thirtieth Day of May, 2023

Katherine Kelly Vidal
Director of the United States Patent and Trademark Office